United States Patent [19]

Edgar

[11] Patent Number: 6,113,394
[45] Date of Patent: *Sep. 5, 2000

[54] READING AID

[75] Inventor: Mark Andrew Edgar, Townsville, Australia

[73] Assignee: Charon Holdings Pty Ltd, Townsville, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,690

[22] PCT Filed: Sep. 4, 1996

[86] PCT No.: PCT/AU96/00552

§ 371 Date: May 2, 1997

§ 102(e) Date: May 2, 1997

[87] PCT Pub. No.: WO97/09704

PCT Pub. Date: Mar. 13, 1997

[30] Foreign Application Priority Data

Sep. 4, 1995 [AU] Australia .................. PN5204

[51] Int. Cl.$^7$ ..................... G09B 17/04; G09B 19/00
[52] U.S. Cl. ........................... 434/179; 434/118
[58] Field of Search ..................... 434/156, 157, 434/159, 167, 169, 170, 172, 173, 174, 175, 176, 178, 179, 180, 181, 182, 183, 184, 307, 118; 364/710.03, 710.06, 710.09

[56] References Cited

U.S. PATENT DOCUMENTS

| | | |
|---|---|---|
| 3,878,327 | 4/1975 | Uhler . |
| 3,906,644 | 9/1975 | Levinson et al. ............. 434/184 |
| 3,938,139 | 2/1976 | Day . |
| 4,160,242 | 7/1979 | Fowler et al. . |
| 4,636,173 | 1/1987 | Mossman . |
| 5,145,375 | 9/1992 | Rubio . |
| 5,147,205 | 9/1992 | Gross . |
| 5,169,342 | 12/1992 | Steele et al. . |
| 5,233,333 | 8/1993 | Borsuk . |
| 5,385,475 | 1/1995 | Sudman et al. . |
| 5,392,386 | 2/1995 | Chalas . |
| 5,442,742 | 8/1995 | Greyson et al. . |
| 5,741,136 | 4/1998 | Kirksey et al. . |

FOREIGN PATENT DOCUMENTS

| | | |
|---|---|---|
| 0 587 394 A1 | 3/1994 | European Pat. Off. . |
| 0 685 791 A2 | 12/1995 | European Pat. Off. . |
| 2611-961 | 9/1988 | France . |
| 1 476 133 | 6/1977 | United Kingdom . |
| 2 287 386 | 9/1995 | United Kingdom . |

OTHER PUBLICATIONS

Copy of PCT Application No. PCT/US94/10814.
Hequet, Marc, "Life's Little E–Mail Problems", Training, (Aug. 1995) vol. 32, No. 8, p. 56.

*Primary Examiner*—Kien T. Nguyen
*Assistant Examiner*—John Edmund Rovnak
*Attorney, Agent, or Firm*—Merchant & Gould P.C.

[57] ABSTRACT

A system (11) for presenting textual and/or graphical information for reading. The system includes a visual display unit (15) for displaying the textual and/or graphical information within a general layout screen, a microcomputer including processing means (13) to receive the textual and/or graphical information in an electronically encoded form and process the same for presentation on the visual display unit (15). A computer program (19) is provided for controlling the presentation of the textual and/or graphical information on the visual display unit (15) in a prescribed manner. A keyboard and mouse input (17) is included for inputting control signals to operate the processing means (13) and the computer program (19) or for altering control parameters of same. The computer program (19) sequentially locates discrete and successive portions of the textual and/or graphical information at the same position on the layout screen at a prescribed blanking time apart, each portion being displayed at this position for a prescribed display time. The general layout screen is divided into a browser pane (37) for displaying a block of textual and/or graphical information to be presented and a flash pane (39), within which the position for sequentially locating the discrete and successive portions of the textual and/or graphical information is centrally situated.

71 Claims, 18 Drawing Sheets developed

Words Per Minute : 30  Interval : 394

READING AID

TECHNICAL FIELD

The present invention relates to a reading aid, and more particularly to a system and method for presenting textual and/or graphical information for reading.

BACKGROUND ART

Over the years, many different techniques have been developed and promoted for increasing reading speed and maintaining comprehension and retention of the reading matter. These techniques have involved departing from the traditional method of reading text presented in the printed page format, where each successive word is read in sequence across the page and line by line. The reason for developing the different reading techniques has been attributed largely to certain drawbacks associated with the traditional reading method which mitigate against increasing reading speed and maintaining comprehension. Moreover, the complete printed page approach of presenting text, where the text is basically static and the reader is required to move their eye along a line, can cause distraction to the reader by the entire text appearing both above, below and beside the word being read. Consequently, many readers suffer from repeating the reading of lines of text, sentences and paragraphs, which slows the reading rate and works against maintaining comprehension and retention of the reading matter during the time that the text is first read.

Alternative reading techniques have tried to address this particular problem by training the reader away from the old style of reading using machines which blank out those portions of the page not being read at a particular point in time, and/or alternatively by highlighting that portion of the text being read. A drawback of these techniques is that the text still remains passive, in that the eye of the reader is still required to move from word to word and keep pace with the highlighted portion of text. Furthermore, with the adoption of these techniques, they are highly machine dependent, and so prior to the modern computer age, were expensive to implement.

With the introduction and widespread acceptance and use of modem day computer systems, such reading techniques can be implemented at a fraction of the cost of what was previously the case. Further, with the power of modem computer systems, more sophisticated and improved reading techniques can be developed and used to improve reading speed and maintain comprehension and retention of reading matter on a full time basis, with textual matter stored and displayed on the computer terminal, as opposed to being used simply as a training tool.

With the popularity of information networks and databases such as Internet and the use of electronic mail, and mass media such as CDROM for transferring and storing large amounts of textual information, there is a much greater incentive now for persons to improve their reading speed and comprehension of textual information than has ever previously been the case. This combined with the inherent power of the modem personal computer and the visual dynamism of graphical user interfaces such as WINDOWS (registered trade mark) and other multitasking windowing environments, there is an ideal opportunity to introduce more proficient reading techniques and incorporate these permanently with appropriate application software employed for the handling of such textual information to provide a new environment for reading which lends itself to quicker practices and improved comprehension.

DISCLOSURE OF INVENTION

Therefore, it is an object of the present invention to provide a system and method for presenting textual and/or graphical information for reading in a modern computing environment which enables a user thereof to increase their reading speed and maintain or improve comprehension and retention ability of the reading matter.

In accordance with one aspect of the present invention, there is provided a system for presenting textual and/or graphical information for reading including:

display means for displaying the textual and/or graphical information on a display medium;

processing means to receive the textual and/or graphical information in an electronically encoded form and process the same for presentation on said display medium;

control means for controlling the presentation of the textual and/or graphical information on said display medium; and input means for inputting control signals to operate said processing means and said control means or for altering control parameters for said processing means and said control means;

wherein said control means sequentially locates discrete and successive portions of said textual and/or graphical information at the same position on said display medium at a prescribed blanking time apart, each portion being displayed at said position for a prescribed display time.

Preferably, said control means includes centring means to centre each said portion laterally within said position.

Preferably, said control means includes application means to define the general layout of said display medium for the presentation of the textual and/or graphical information and the visual control attributes of the system.

Preferably, said application means is directly responsive to said control parameters for said control means and invokes particular control functions for defining and specifying particular characteristics of the presentation of the textual and/or graphical information within said general layout, in accordance with the setting of a particular control parameter therefor and the inputting of said control signals from said input means.

Preferably, said control means includes paning means to arrange said general layout into one or more panes in which the textual and/or graphical information is presented.

Preferably, said paning means selectively divides said visual layout into a flash pane and a browser pane, said flash pane including said position and said browser pane including an area for locating a larger portion of said textual and/or graphical information from which said discrete portions are derived.

Preferably, said control means includes centring scrolling means for automatically scrolling the presentation of said larger portion within said browser pane and centring the row of said larger portion which is presenting corresponding textual and/or graphical information to said discrete portion, within said browser pane.

Preferably, said paning means includes highlighting means to highlight said corresponding textual and/or graphical information within said browser pane.

Preferably, said control means includes delay means for setting the control parameters for said prescribed blanking time and said prescribed display time.

Preferably, said control means includes portion selection means for setting the control parameters for said discrete portion.

Preferably, said processing means is a microcomputer having a graphical user interface including a multitasking, windowing function.

Preferably, said control means includes a time management means for monitoring the prospective and elapsed time of functions performed thereby and coordinating the relinquishment and return of control to and from said multitasking windowing function.

In accordance with another aspect of the present invention, there is provided a method for presenting textual and/or graphical information for reading including:

selecting discrete and successive portions of the textual and/or graphical information;

displaying said portions sequentially at the same position of a display medium at a prescribed blanking time apart; and displaying each portion at said position for a prescribed display time.

BRIEF DESCRIPTION OF DRAWINGS

The invention will be understood in the light of the following description of one specific embodiment thereof. The description is made with reference to the accompanying drawings, wherein.

BEST MODE FOR CARRYING OUT THE INVENTION

The embodiment is directed towards a system and method for presenting textual and/or graphical information for reading using a modem microcomputer system running a multitasking windowing graphical user interface of the type known as WINDOWS (registered trade mark).

Figure 1:
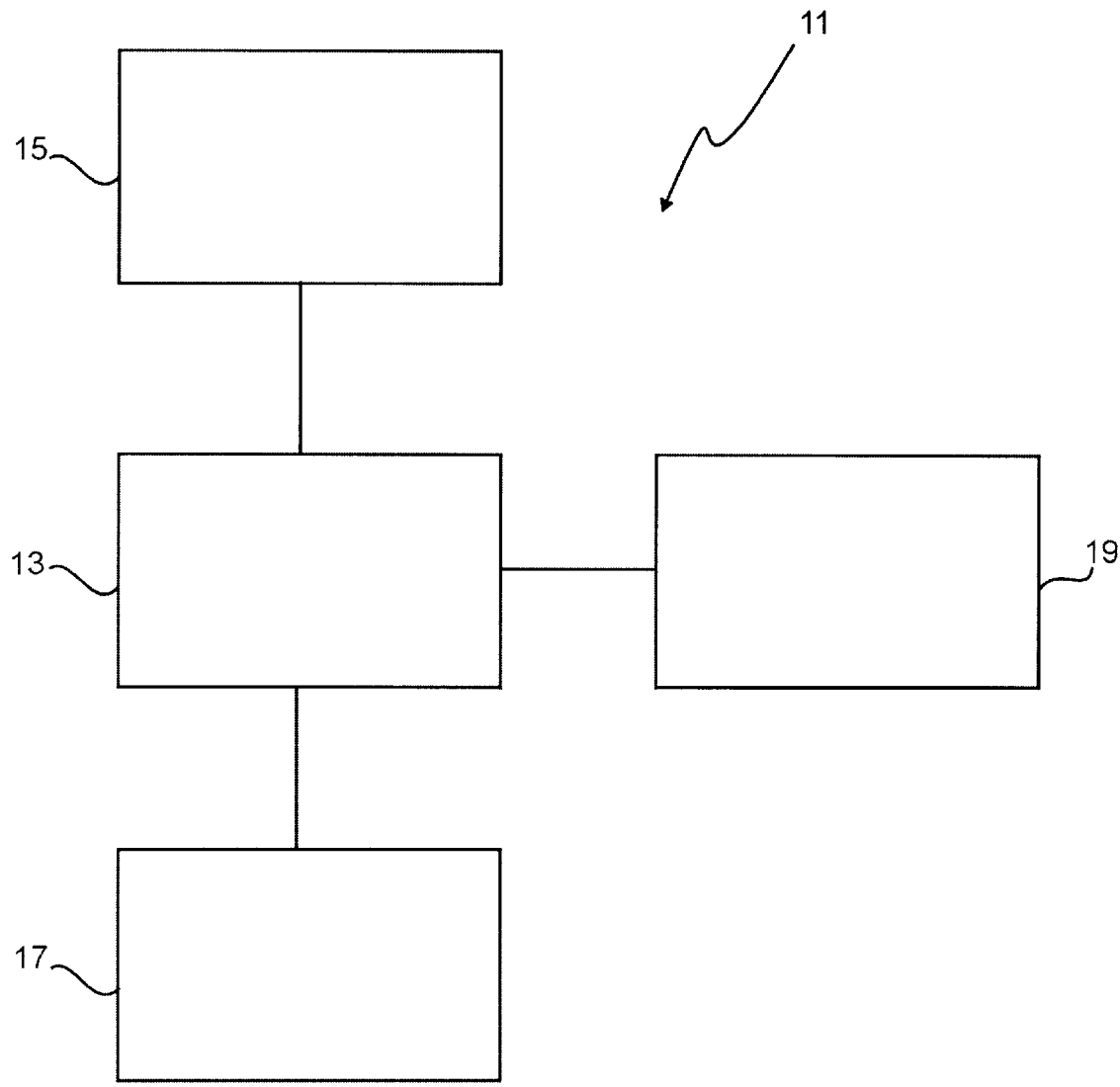
FIG. 1 is a block diagram of the main functional components making up the system.

As shown in FIG. 1 of the drawings, the system 11 generally comprises a processing means 13 in the form of a microcomputer, having a display means 15 in the form of a visual display unit, an input means 17 in the form of a keyboard and a mouse, and control means 19 in the form of a computer program.

The microcomputer of the processing means 13 includes suitable storage media for storing textual and or graphical information in an electronically encoded form, such as in a text file, and also the computer program of the control means 19.

Such storage media may be a hard disk, tape, CDROM, floppy disk or the like, or alternatively, may be a remote database which is accessed via a modem or other communication interface for receipt and processing of the same ready for visual presentation upon the visual display unit.

The microcomputer is able to load the computer program of the control means 19 in known manner, and select a particular text file for processing and presenting the textual and graphical information stored thereon for reading purposes on the visual display unit.

The visual display unit of the display means 15 incorporates a display medium in the form of a screen of a cathode ray tube, liquid crystal display or plasma display on which the visual image of the textual and/or graphical information is displayed in known manner.

The keyboard and mouse of the input means 17 are used in combination or alternatively of the other for inputting control signals to the microcomputer processing means 13 to operate the same and the computer program of the control means 19, and to alter control parameters of the processing means and control means.

The microcomputer of the processing means 13 operates under an appropriate operating system such as MS-DOS (registered trade mark) and a multitasking and windowing graphical user interface such as WINDOWS 3.1 (registered trade mark) as previously described. The computer program of the control means is in the form of application software operating as a native WINDOWS (registered trade mark) program developed in an object oriented programming language, namely C++ using dynamic linked libraries.

Accordingly, the computer program includes application means to define the general layout of the display medium for the presentation of the textual information and the visual control attributes of the system in accordance with WINDOWS 3.1 (trade mark). The application means is directly responsive to the control parameters which are defined for the program and invokes particular control functions for defining and specifying particular characteristics of the presentation of the textual information within the general layout. These control parameters are settable by the inputting of relative control signals via the keyboard or mouse and will be described in further detail later.

The computer program also includes paning means to arrange the general layout into one or more panes in which the textual information is presented. In this respect, the paning means selectively divides the visual layout into a flash pane and a browser pane which will also be described in more detail later.

For the purposes of this description, familiarity with the computer programming language C++, the dynamic linked library OWL 2.0, the compiling of programs in Borland C++ 4.0 (trade mark), the running of WINDOWS 3.1 (trade mark) and performing WINDOWS API calls, is assumed.

The computer program comprises a compilation of four source files, namely a '.cpp file' comprising the main source code for the computer program, a '.hpp' file being the header for the computer program, a '.rc' file being the resources of the computer program and a '.rh' file being the resource header of the computer program. The compilation of these four files creates a '.exe' executable file and is run together with the appropriate dynamic linked libraries included in Borland C++ 4.0, namely BIDS402.DLL, OWL202.DLL, BC402RTL.DLL and CTL3DV2.DLL.

The program is operated by means of menu items, each of which have equivalent accelerators. Each menu item and its equivalent accelerator is designed to send out a message which invokes a function in a prescribed class, as defined in the response table in the source code.

Listed below is a table showing the menu path of selection in the first column, the accelerator that is equivalent to this menu selection in the second column, the WINDOWS message that is sent to invoke a function in the third column, and the function that will be invoked by this message in the fourth column.

derived from the public class TDialog, the class TBrowserPane 21e, derived from the public class TEditFile, the class TFlashPane 21f, derived from the public class TWindow, and the class TString 21g derived from the public class String.

Each of these classes will be described in further detail with reference to their member functions, and in particular those that have been specifically derived for the particular class as well as those that are overwritten functions obtained from the corresponding ancestor class.

Dealing firstly with the class TCharonApp 21a, this class is derived from the ancestor class TApplication and essentially comprises application means to create the present computer program application, and a TCharonWin instance.

The member functions of this class are as follows:

| TCharonApp | TApplication |
| --- | --- |
| TCharonApp | |
| InitMainWindow | ~~InitMainWindow~~ |

1 statusBar (Public Variable)
   TStatusBar *statusBar;
   This is the pointer to the instance of the status bar at the bottom of the application window.
2 TCharonApp (Public Constructor)
   TCharonApp ( );
   This constructs the computer program application.
3 InitMainWindow (Private Method)
   void InitMainWindow ( );

| Menu Path | Accelerator | Link Message | Calls TCharonWin Member Function |
| --- | --- | --- | --- |
| File/Open | F3 | IDM_OPEN | CmFileOpen() |
| File/Exit | Alt + F4 | 24310 | Standard OWL quit application |
| Speed/Increase | Ctrl + Up | IDM_DEC_SPEED | CmIncreaseSpeed() |
| Speed/Decrease | Ctrl + Down | IDM_INC_SPEED | CmDecreaseSpeed() |
| Speed/Update WPM | TAB | IDM_RETABULATE | CmResetWPM() |
| Speed/Pause or Resume | SPACE | IDM_PAUSE | CmPause() |
| Read/Go | ENTER | IDM_GO | CmGo() |
| Read/Restart | Ctrl + Home | IDM_RESTART | CmRestart() |
| Read/Select all | | IDM_SELECTALL | CmSelectAll() |
| Options/Delays | | IDM_DELAYS | CmDelays() |
| Options/Font | | IDM_FONT | CmFont() |
| Options/Number of flashes | | IDM_NUM_FLASHES | CmNumFlashes() |
| Options/Auto size font | | IDM_AUTOSIZE | CmAutoFont() |
| Options/Browser window | | IDM_TOPON | CmTopOn() |
| Help/Using help | | IDM_HELPONHELP | CmHelpOnHelp() |
| Help/Concepts | | (Not implemented) | (Not implemented) |
| Help/About | | IDM_ABOUT | CmAbout() |

Figure 2:
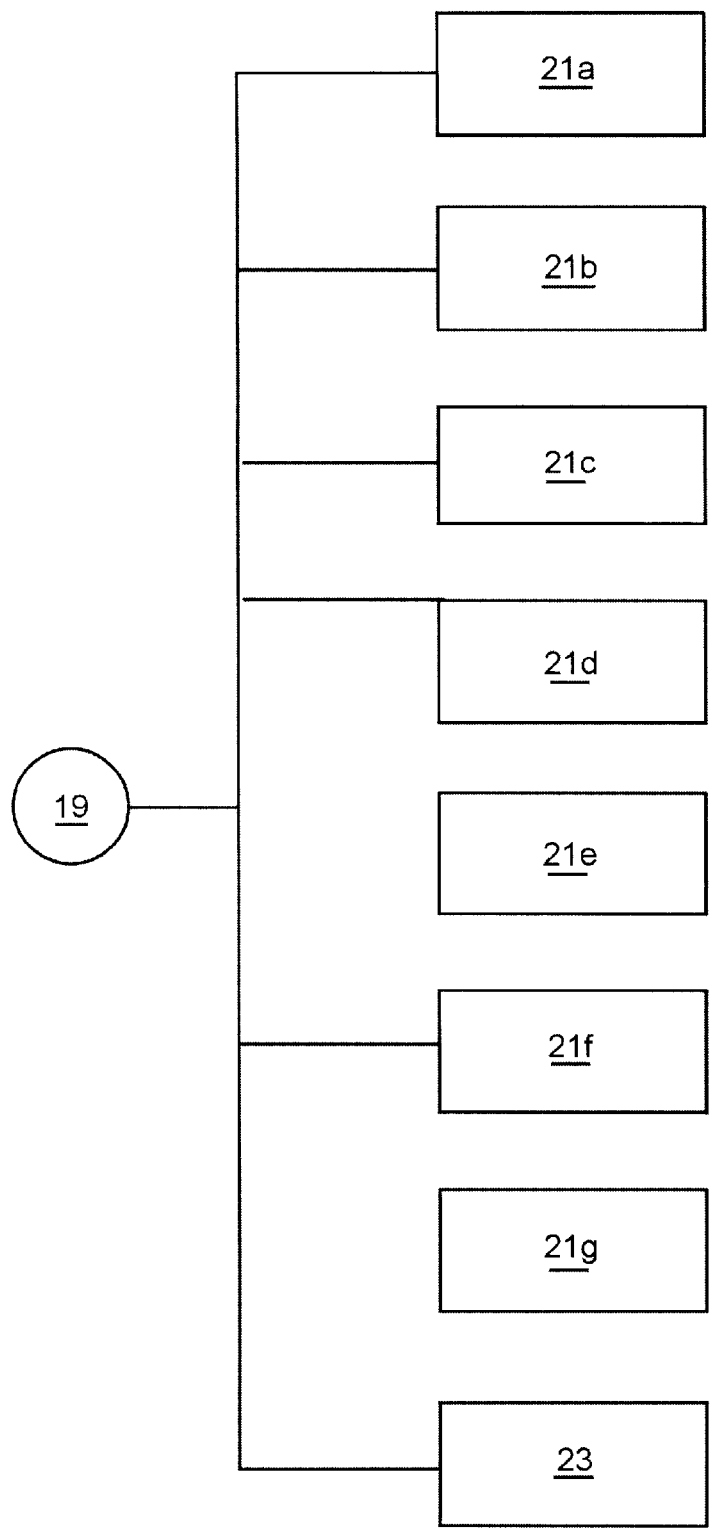
FIG. 2 is a block diagram illustrating the classes of functions which make up the control means.

The computer program comprises a number of classes which are derived from corresponding ancestor classes provided in the Borland C++ 4.0 standard library or in the OWL library. As shown in FIG. 2 of the drawings, there are seven such classes 21a to 21g, which are additional to a set of non-class functions 23, all of which have been grouped together.

The seven classes are the class TCharonApp 21a which is derived from the public class TApplication, the class TCharonWin 21b derived from the public class TLayoutWindow, the class TDelaysDialog 21c derived from the public class TDialog, the class TFlashesDialog 21d, also This function overwrites the InitMainWindow( ) of the ancestor class. It enables the use of MS Windows' Ctl3D DLL which displays dialog boxes in 3D.

It creates a recessed status bar and assigns the printer to variable statusBar. Next it creates a control bar by instantiating a TControlBar object. "Smart Icons" are then inserted into this bar. Each icon, which is taken from the resources, will generate a message when depressed, but each of these messages will have an equivalence in the menu. They are:

| ICon Description | Menu Path |
|---|---|
| Open a file | File/Open |
| Green start lights | Read/Go |
| Up arrow | Speed/Increase |
| Down Arrow | Speed/Decrease |
| Double vertical lines | Speed/Pause or Resume |

The function goes further to bind the frame to the main application window by setting its window size from the computer program initialisation file, assigning it a menu, icon, and accelerator from the resources.

Both the width and height of the main window are taken from the entries Width and Height in the initialisation file (see TCharonWin::CanClose( )). The entry Hint, is used as the parameter to call SetHintMode( )

The next class TCharon Win 21b as previously described is derived from the TLayoutWindow class. It holds two display panes, namely the top pane (an instance of TBrowserPane, a descendent TEditFile class), which contains and displays an ASCII text file, and the bottom pane (an instance of TFlashPane, a descendent of Twindow) which displays a word or a line of words.

This class is a friend of TFlashPane.

The member functions of this class are as follows:

| TCharonWin | TLayoutWindow |
|---|---|
| TCharonWin | |
| ~TCharonWin | |
| SetupWindow | ~~SetupWindow~~ |
| CanClose | ~~CanClose~~ |
| SetupPanes | |
| ReconfigureWindow | |
| IsFlashing | |
| SetDisplayFont | |
| DisplayNextLine | |
| DelayUntilTime | |
| FlashLoop | |
| PauseFlashing | |
| ShowWordsPerMinute | |
| WordsPerMinute | |
| EvSize | ~~EvSize~~ |
| CmFileOpen | |
| CmGo | |
| CmSelectAll | |
| CmRestart | |
| CmDelays | |
| CmFont | |
| CmNumFlashes | |
| CmAutoFont | |
| CmTopOn | |
| IncreaseAWord | |
| CmIncreaseRate | |
| CMDecreaseRate | |
| CmPause | |
| CmResetWPM | |
| CmHelpOnHelp | |
| CmAbout | |

1 rates (Public Variable)

TDelayRates rates;

This is an instance of the structure containing the delay times for the different conditions. The members of the structure and their purpose is as below:

| Member Variable | Purpose |
|---|---|
| UINT interval | Delay between two word flashes. This interval does not consider the blanking out time between words. |
| UINT blackout | Delay of a blank screen between two flashes. |
| UINT punctuations | Delay if a punctuation is detected as the last or first character of a flash. |
| UINT ends | Delay if the last character of a flash is a punctuation for end of a sentence. |
| UINT cr | Delay if the next two characters in the file stream are carriage returns. |

2 fileData (Private Variable)

TOpenSaveDialog::TData fileData;

This is an instance of the structure that will be used to get the file name to read. See OWL's class TFileOpenDialog.

3 fontData (Private Variable)

TChooseFontDialog::TData fontData;

This is an instance of the structure that will be used to get the font attributes to display. See OWL's class TchooseFontDialog.

4 browserpane (Private Variable)

TbrowserPane browserpane;

This holds an instance of the top display pane. See class TBrowserPane.

5 flashpane (Private Variable)

TFlashPane flashpane;

This holds an instance of the bottom display pane. See class TFlashPane.

6 flashing (Private Variable)

FLASH_LOOP flashing;

FLASH_LOOP is an enumerated type of FLASHING, NOT_FLASHING or QUIT. The variable, flashing, is a flag to indicate whether the bottom pane is flashing words or not. This status is needed to be known at various places within the program such as when the user is relocating the cursor in the top pane. A status of QUIT is set when the user choose to exit the application.

7 disFont (Private Variable)

Tfont *dispFont;

This is the pointer to the font that will be used for displaying a flash in the bottom pane.

8 autoSize (Private Variable)

BOOL autoSize;

This is a boolean flag of the user font size setting, as used in the bottom pane. A TRUE indicates that the font is to be sized in proportion to the window, and a FALSE indicates that the font will be drawn according to the user's size specification in fontData.

9 topOn (Private Variable)

BOOL topOn;

This is a boolean flag of the user top pane setting. A TRUE indicates that the top pane should be displayed, and a FALSE indicates that the top pane should not be shown.

10 hasTopPane (Private Variable)

BOOL hasTopPane;

This is a boolean flag indicating the top pane display status. A TRUE indicates that the top pane is currently displayed (regardless of whether topPane is TRUE or FALSE), and a FALSE indicates that the top pane is currently off. The difference between this and topOn flag is that this flag indicates the current status of the application, and topOn indicates what the user prefers. Due to the fact that, when the application goes into a pause mode, the top pane is shown regardless of the user's preferred setting.

11 ifs (Private Variable)
  ifstream *ifs;
  This is the pointer to the handle of the file to read.
12 strIn (Private Variable)
  Tstring strIn;
  This is an instance of Tstring. This holds the current word or words being flashed. See Tstring.
13 pauseTick (Private Variable)
  DWORD pauseTick;
  This involves the accumulative timer to tick while the application is in the pause mode. This is done to obtain an accurate Word-Per-Minute (WPM) count.
14 initialTick (Private Variable)
  DWORD initialTick;
  This involves the beginning timer to tick which begins the Word-Per-Minute (WPM) count.
15 wordCount (Private Variable)
  UINT wordCount;
  This holds the number of words flashed in the bottom pane since resetting initialTick.
16 pauseStarted (Private Variable)
  BOOL pauseStarted;
  This is a boolean indicating whether the flash reading was started through an "unpause" as opposed to a "go". A TRUE indicates that the flashing was started in CmPause( ) and a FALSE indicates the flashing was started in CmGo( ). This is because an "unpause" and "go" are two different features and have two different behaviours, and the application needs to know the last event that activates it. If the flashing is activated by an unpause in CmPause( ), it continues to flash words beyond its end applications marker, whereas a "go" would stop flashing when it reaches the end application marker.
17 delay_ms (Private Variable)
  UINT delay_ms;
  This holds the number to be used as the parameter for Delay( ) so that a call to Delay( ) with this value is one millisecond (see Delay( )). This variable is calculated and initiated only once in SetupWindow( ) when the application starts up. As explained in the description in Delay( ), this local loop delay is used to by-pass the 55 millisecond barrier.
18 TCharonWin (Public Constructor)
  ~TCharonWin ( );
  This deletes the instances of ifstream (*if, the file to display) and Tfont (*dispFont, the font used in the display in the bottom pane)
19 ~TCharonWin (Private Destructor)
  ~TCharonWin ( );.

This deletes the instances of ifstream (*if, the file to display) and Tfont (*dispFont, the font used in the display in the bottom pane).
20 SetupWindow (Private Method)
  void SetupWindow ( );
  This function overwrites the ancestor function SetupWindow( ). After calling the underlying function, it refreshes the status bar, then checks or unchecks two menu items. The menu items manipulated are as below:

| Menu Path | Checked on condition ... |
|---|---|
| Options/Auto size font | autoSize is TRUE |
| Options/Browser window | topOn is TRUE |

At the end, it does a timing test to calculate the value of delay_ms. To do this, it gets the current tick from the system and calls Delay( ) with a large number as the parameter. When it returns, it gets the current tick from the system again. The difference between this and the previous system tick is the number of ticks that will elapse while Delay( ) is running. The original number given as the parameter to Delay( ) divided by the tick difference is the new value that must be given to Delay( ) to make it delay one millisecond. Graphically in pseudo-code, this is:
  origTick=Get original clock tick from system
  Call Delay( ) with arbitrary large number n
  delay_ms=n/(clock tick now—origTick)
21 CanClose (Private Method)
  BOOL CanClose( );
  This function overwrites the ancestor function. First it calls the underlying CanClose( ), and if the main window cannot be closed for some reason, this function returns.
  Some values are saved into the file initialisation file, CHARON.INI. Among these are the width and the height of the Window. However, the window coordinates at the end of this session may not be the actual coordinates at the start of the next session. The reason for it is that during a pause mode, the top pane pops up even if the Browser Window option is set off. A check is needed so that the user flag (topOn) is consistent with the current window status (hasTopPane). If the user setting is off and there is a top pane currently, a call to ReconfigureWindow( ) is made to resize the main window before the coordinates are taken.
  The table below shows the variables saved into CHARON.INI:

| Variable Name in Code | Entry Name in CHARON.INI | Where used |
|---|---|---|
| autoSize | Autosize | TCharonWin::TCharonWin() |
| blackout | Blackout | TCharonWin::TCharonWin() |
| punctuations | Punctuations | TCharonWin::TCharonWin() |
| ends | Sentence End | TCharonWin::TCharonWin() |
| cr | Paragraph End | TCharonWin::TCharonWin() |
| interval | Interval | TCharonWin::TCharonWin() |
| strIn.numFlashes | Flash | TCharonWin::TCharonWin() |
| fontData.LogFont.IfHeight | Font Height | TCharonWin::TCharonWin() |
| fontData.LogFont.IfFaceName | Font Face | TCharonWin::TCharonWin() |
| Attr.W | Width | TCharonApp::InitMainWindow() |
| Attr.H | Height | TCharonApp::InitMainWindow() |

This function then requests WINHELP to terminate.

In normal circumstances, returning TRUE in CanClose( ) causes the application to exit. However, in this application, CanClose( ) may be activated from within function FlashLoop( ). Thus, IsFlashing( ) is called to know whether this was the case. If it is, a flag (setting flashing to QUIT) is set and CanClose( ) returns FALSE to inform FlashLoop( ) to terminate the application (FlashLoop( ) calls the API PostQuitMessage( ) to do this and hence will bypass any further call to CanClose( )). If flashing is not active, CanClose( ) does a normal exit.

As a note, CanClose( ) cannot return TRUE if it has been signalled to close while a flash is in progress. This will cause a protection error.

22 SetupPanes (Private Method)

void SetupPanes (BOOL expand);

This function resizes the proportion of the top and bottom panes. The parameter expand determines whether the top pane should be shown as 65% proportion, or whether it should not be shown by being given a 0% proportion. See OWL's TLayoutWindow on proportioning.

Note that this function assigns the values to the layout metric and calls the ancestors SetChildLayoutMetric( ) to associate these values with the two panes. It does not call ancestor's Layout( ) to redisplay the changes.

23 ReconfigureWindow (Private Method)

void ReconfigureWindow (BOOL expand);

This function is called to expand and contract the main application window. If the parameter expand is TRUE, the top pane is displayed at 65% proportion of the main window while the lower pane remains the same absolute size. The main window is therefore enlarged. If the parameter expand is FALSE, the top pane is displayed at 0% proportion of the main window while the lower pane remains the same absolute size. The main window is therefore shrunk.

This is done by taking the window size of the parent window (ie main window) and the size of the lower pane. This parent window is then resized by call MoveWindow( ) with the parent's current left and top coordinate and the current width. The height is the parent's current height with the fraction of the lower pane's height as in the calculation below:

height of parent+/−height of lower pane*65%/(100−65%)

The fraction can either be positive if the window is to be enlarged, or negative if the window is to be reduced.

The above calculation concerns only the resizing of the main application window. The resizing of the inner two panes is done via call SetupPanes( ) and TLayoutWindow::Layout( ).

24 IsFlashing (Private Method)

BOOL IsFlashing ( );

Returns TRUE if the bottom pane is flashing text (ie variable flashing has the status FLASHING).

25 SetDisplayFont (Private Method)

void SetDisplayFont (int height);

This function is called by TFlashPane::Paint( ) and creates the font used to display text in the bottom pane. This is so only if the variable dispFont is NULL otherwise it terminates. If the user option 'autoSize' is set, the TFont instance is created with the parameter height. Otherwise this parameter is ignored and the instance created with the font metrics in fontData.

26 DisplayNextLine (Private Method)

int DisplayNextLine ( );

This function gets and displays the next word or words (as determined by the variable wordCount). It returns the time, in milliseconds, that this line of text will have to be displayed. Both panes reflect the change in display. Before proceeding to display, it checks whether the flashing was started by a "pause" or a "go". If it is started by a "go", the function compares the current file position to the end of the user selection block (see BlockEnd( ) of instance manyWordsPane) to verify whether the line of text is at, or beyond, the user end selection marker. If so, no display is done.

At any rate, if the function is unable to obtain more words to display with, it calls PauseFlashing( ) to stop flashing and calls SelectBlock( ) of instance manyWordsPane to mark the block that was the user's original selection in the top pane.

If display is possible, the text is reflected in both panes. For the top pane, this is taken care of by calling PresentLine( ) of the instance manyWordsPane. For the bottom pane, this is taken care of by calling TFlashPane::RepaintWindow( ). The total number of flashes (wordCount) is incremented with the number of flashes read by GetAFlash( ).

Before this function exits, a calculation is made of the amount of delay that must be made before a new line of text can be displayed. This delay is the interval plus an extra delay. If the line of text is an end of a sentence (see IsSentenceEnd( ), and if the next character in the stream is a new line (ie carriage return), the line is also an end of a paragraph. Thus the extra delay is that of a paragraph end (rates.cr) or a sentence end (rates.ends), whichever is greater. If however the first or last character of the line text is a punctuation (see IsPunctuation( )), then the extra delay is for a normal punctuation (rates.punctuation).

27 DelayUntilTime (Private Method)

void DelayUntilTime (UINT xTime);

This function intelligently pauses the program for a given amount of time (in milliseconds) by setting up a local delay loop.

If the parameter, xTime, is more than 55 ms, ie more than one clock cycle in Windows, it calls the API GetTickCount( ) continuously until the delay time is met, or when there is less than 55 ms remaining. TApplication::PumpWaitingMessages( ) is called between time checks to yield to other applications (hence preventing freezing) while this function waits.

If xTime or the remaining delay time is less than 55 ms, member function, Delay( ), is called to dwindle this amount by a machine instruction loop process (see Delay( )).

28 FlashLoop (Private Method)

BOOL FlashLoop ( );

This function is the core of the application and is called by CmGo( ) and CmPause( ). In essence it gets from the file a line of text, displays it, blanks it out and checks that it is not in an exit condition.

First CmResetWPM( ) is called to initialise the WPM count. Then it goes into a loop ensuring that the application is in a flashing mode (by calling IsFiashing( )). While in the flashing mode, it calls SelectionChanged( ) of instance manyWordsPane to see if the selection markers in the top pane are the same as was previously the case. If not, the user has relocated the cursor or the selection block. When this occurs, it gets the starting marker and relocates the file pointer (with ifstream::seekg( )) to the text position that has the same offset as the marker.

It then calls DisplayNextLine( ) to read a line of text and reflect it in both panes. DisplayNextLine( ) returns the delay that must be taken before the panes can be updated again. This return becomes the parameter to call DelayUntilTime( ) which sleeps for the given time.

When the proper delay has been made, the bottom pane is blanked. This is done by first nullifying strIn and then calling TFlashPane::RepaintWindow( ) for the bottom pane which will update and ultimately call TFlashPane::Paint( ). DelayUntilTime( ) is called to delay the set time for blanking the bottom pane, rates.blackout.

Next, the status bar is updated with a call ShowWordsPerMinute( ).

In the case of a very small value for delays, such as having zero delays throughout, the application displays continuously without reacting to any Windows messages. Thus all other MS Windows applications would freeze including itself. To prevent this, TApplication::PumpWaitingMessages( ) is called. This is done every fifteen loops so that the WPM count is not too askew since PumpWaitingMessages( ) may take some time to process.

Lastly, before a reloop, this function checks whether the application wants to quit (variable flashing has the value QUIT). It this is true, it sends a quit message with API call, PostQuitMessage( ) and pauses flashing so that this loop can be terminated.

29 PauseFlashing (Private Method)

void PauseFlashing ( );

This function sets the flag to stop flashing text and sets both the selection markers in the top pane to the current position as in the file stream (ie de-select block). This function only works if flashing is currently off.

30 ShowWordsPerMinute(Private Method)

void ShowWordsPerMinute ( );

This function calls the member function WordsPerMinute( ) to obtain the current WPM count, sets it up into a C string and calls TStatusBar::SetText( ) to write it into the status bar.

31 WordsPerMinute(Private Method)

UINT WordsPerMinute ( );

This function returns the current WPM count. The word count per millisecond is found by taking the difference between the current tick count (by calling the API's GetTickCount( ) and the tick count at the start of tabulation (initialTick), and then inversely dividing it by the number of words read during this period. This figure is then multiplied by sixty thousand to convert it to WPM. As a precaution against a "divide by zero" error, the current tick is compared against the initial tick, and if they are the same, it does no calculation but returns a zero WPM.

32 EvSize (Private Method)

void EvSize (UINT sizetype, TSize& size);

This function overwrites the ancestor function. It ensures that the display font (dispfont) is deleted on every WM_SIZE message (ie resizing of the main window by the user) by deleting and nullifying the font so that it is recreated later in function Paint( ) of the instance flashpane, and ultimately in SetDisplayFont( ). It then calls the base class EvSize( ).

33 CmFileOpen (Private Method)

void CmFileOpen ( );

This function is called on a file open request. It creates and executes an instance of the TFileOpenDialog( ) using the TData instance, fileData. If it returns IDOK, the old file stream is deleted, if any, and flashing status is stopped with PauseFlashing( ). A new file stream is created by calling the constructor ifstream with the parameter FileName obtained from TFileOpenDialog( ). If the construction is successful, the top pane is asked to read the same file. This is done by calling SetFileName( ) and Read( ) of the instance browserpane.

Next, the file name is appended to the application's window title with the API call, SetWindowText( ). Then CmSelectAll( ) is called to block all text in the top pane and remove the horizontal scroll bar.

If ifstream cannot be instantiated, ie file cannot be open, an error dialog pops up (using API's MessageBox( )). Such a case should never happen since TFileOpenDialog( ) checks for the file availability before ifstream opens it.

However, the browserpane may fail when it tries to call Read( ) to read in the whole file into the top pane. This happens if the file to be read exceeds 64K because the top pane is an instance of a standard OWL class object, TEditFile( ) (see class TFlashPane).

34 CmGo (Private Method)

void CmGo ( );

This function is called to start or restart reading. It only proceeds if there is a file open (ie ifstream is not NULL) and if the reading is not already active (ie IsFlashing( ) returning FALSE). There are occasions when the user's flag for the top pane is turned off (ie topOn is FALSE) but the pane is actually shown (ie hasTopPane is TRUE) such as during a pause. If this should happen, the top pane is hidden with call ReconfigureWindow( ).

When this is done, calls to functions are made to note if the top pane block selection changes, set flashing to restart at the beginning of the block, and reset the WPM count variables (see TBrowsePane::BlockChanged( ), CmRestart( ), and CmResetWPM( )).

Finally it sets a flag to indicate that the flashing was not started with an unpause key (ie pauseStart is FALSE) then calls the core flash loop, FlashLoop( ).

35 CmSelectAll (Private Method)

void CmSelectAll ( );

This function is called on a request to select all text in the top pane. It simply calls SelectAll( ) of the browserpane instance.

36 CmRestart (Private Method)

void CmRestart ( );

This function is called on a request to restart the flashing. If there is a file stream, flashing is stopped (with PauseFlashing( )). The file stream is repositioned to the starting application marker of the top pane. Both the beginning and ending API markers are set to the beginning application marker position (with a call to SetSelection( )) so that the API block disappears and the 'I' beam is also moved to this position.

37 CmDelays (Private Method)

void CmDelays ( );

This function is called on a request to let the user edit delay rates. A dialog of delay rates (see class TDelaysDialog) is created and executed. If OK is pressed, the variables for the WPM calculation are reset (see CmResetWPM( )).

38 CmNumFlashes (Private Method)

void CmNumFlashes ( );

This function is called on a request to let the user edit the number of words that would be seen on the bottom pane. A dialog TFlashesDialog is created and executed, given the parameter of the current number of flashes. If OK is pressed, the strIn.numFlashes contains the new value.

39 CmFont (Private Method)

void CmFont ( );

This function is called on a request to let the user select the font to use for display in the bottom pane. A common dialog of available fonts (see class TDelaysDialog) is created and executed. If OK is pressed, the current font is deleted and nullified (see dispFont). Thus TFlashPane::Paint( ) would be prompted to recreate a font with the user selected font metric in fontData.

40 CmAutoFont (Private Method)
   void CmAutoFont ( );
   This function is called on a request to let the user select or deselect the auto font resizing. It is a toggle function that sets variable autoSize to TRUE or FALSE on alternate calls. The menu item is also checked and unchecked with CheckMenuItem( ) as this variable is toggled.
   For each call, the current display font, dispFont, is deleted and nullified so that TFlashPane::Paint( ) can recreate the display font in the correct size.

41 CmTopOn (Private Method)
   void CmTopOn ( );
   This function is called on a request to let the user toggle the display of top pane on and off. If this function is called to toggle the top pane on, and if the top pane is not already shown (such as during a pause), it calls ReconfigureWindow( ) with a TRUE parameter to display the top pane. Likewise, if this function is called to toggle the bottom pane off, and if the top pane is not already turned off, it calls ReconfigureWindow( ) with a FALSE parameter to "remove" the top pane.
   The value of the variable topOn is toggled and the menu item is checked or unchecked with CheckMenuItem( ).

42 IncreaseAWord (Private Method)
   void IncreaseAWord (SIGN sign)
   This function calculates the display time interval (in milliseconds) needed between two flashes (see rates.interval) so that the change in the WPM rate is roughly 1 WPM. Note that when the display time interval is already very short, a variation of one millisecond may cause a change in the WPM rate of more than 1 WPM. In this case, the interval is a preset millisecond, MIN_INTERVAL.
   The parameter, sign, is either NEGATIVE or POSITIVE, which essentially determines the variation to be an interval increase or decrease.
   The function first calculates the current WPM count, and if it is not zero (to preempt a processor "Divide by Zero" error), rates.interval is checked to be within the range as specified by MIN_INTERVAL and MAX_INTERVAL. If it is not in this range, it is corrected so that this is true. This is so as to keep the interval within a discernible range. That is to say that outside this range, there is no perceptible difference in speed to the application user.
   A calculation is made by dividing current (corrected) interval by the current WPM to find out how much interval must be increased or decreased. If this change (delta) is too small, (ie less than zero), the interval to increase or decrease is simply one.
   Before adding this variation to the current interval, it checks that the new interval will not be less than MIN_INTERVAL, and most importantly, the new interval will not wrap around (since interval is an unsigned integer). If it is less than MIN_INTERVAL, interval is set to this value.
   Finally, CmResetWPM( ) is called to reset the variables for a new WPM count 43 CmIncreaseRate (Private Method)
   void CmIncreaseRate ( );
   This inline function is called on a request to let the user increase the flashing speed. It simply calls IncreaseAWord( ) with parameter of POSITIVE to indicate a positive delta.

44 CmDecreaseRate (Private Method)
   void CmDecreaseRate ( );
   This inline function is called on a request to let the user decrease the flashing speed. It simply calls IncreaseAWord( ) with parameter NEGATIVE to indicate a negative delta.

45 CmPause (Private Method)
   void CmPause( );
   This function is called on a request to stop or start the flashing. If there is a file stream and IsFlashing( ) returns TRUE, flashing is paused. Otherwise if there is a file stream and IsFlashing( ) returns FALSE, flashing is restarted or unpaused.
   In case of pausing, if there is currently no top pane (ie hasTopPane is FALSE), the top pane is turned on via ReconfigureWindow( ). TBrowserPane::Scroll( )) is called to scroll the top pane many times to the left, thus ensuring that column one is visible if it is not already so. TBrowserPane::PresentWord( ) is called to bring the two API markers together to reflect the current file position. A call is then made to PauseFlashing( ) to pause the flashing process, and the current system tick is stored in variable pauseTick which will be used later to consider the number of ticks that have gone by during this pause.
   In the case of an unpause, if the user's top pane display option is off (ie topOn is FALSE) and there is currently a top pane (ie hasTopPane is TRUE), the top pane is "removed" by calling ReconfigureWindow( ). TBrowserPane::BlockChanged( ) is called to re-mark the current line of text, if necessary. To exclude the number of ticks that had elapsed during the pause from the WPM count, the tick to start the WPM count (ie initialTick) should be brought forward. This is done by getting the current tick count (calling GetTickCount( )) and subtracting the tick count during a pause (ie pauseTick). The variable pauseStarted is set to TRUE and FlashLoop( ) is called to resume flashing.

46 CmResetWPM (Private Method)
   void CmResetWPM ( );
   This function is called on a request to reset variables pertaining to calculation of WPM count. The number of words flashed so far is zeroed (ie wordcount) and the tick at the start of the first flash since word count zero is set to the current tick with GetTickCount( ).

47 CmHelpOnHelp (Private Method)
   void CmHelpOnHelp ( );
   This function is called on a request to invoke WINHELP.EXE With the help file WINHELP.HLP.

48 CmAbout (Private Method)
   void CmAbout ( );
   This function is called on a request to invoke an "About" dialog.

The class TDelaysDialog 21c is a dialog box class and is derived from TDialog. This object obtains the various delay rates from the user.

The members of this class are as follows:

| TDelaysDialog | TDialog |
|---|---|
| TDelaysDialog | |
| SetupWindow | ~~SetupWindow~~ |
| CanClose | ~~CanClose~~ |

1 rates (Private Variable)
   TCharonWin::TDelayRate& rates;
   This is the reference to the structure variable of the type, TDelaysDialog, in its parent which contains the various rates of delay (see nested structure TDelayRate within TCharonWin class).

2 TDelaysDialog (Public Constructor)
   TDelaysDialog(TWindow*parent,
      TCharonWin::TDelayRate&_rates)

This constructor creates the dialog object. The parameter is its parent pointer and the reference to the structure variable rates in its parent.

3 SetupWindow (Private Function)

void SetupWindow ( );

This function overwrites the function in the ancestor class. It calls SetDIgItemInt( ) to set variables interval, blackout, punctuations, ends, cr in the nested structure TDelayRate.

4 CanClose (Private Function)

BOOL CanClose ( );

This function overwrites the function in the ancestor class. It calls GetDIgItemInt( ) to get the contents of its edit boxes into the variable structure TDelayRate. Finally, it returns the returned value of the base's CanClose( ).

The class TFlashesDialog 21d is a dialog box class and is derived from TDialog. This object obtains the number words per flashes from the user.

The members of this class are

| TFlashesDialog | TDialog |
| --- | --- |
| TFlashesDialog | |
| SetupWindow | SetupWindow |
| CanClose | CanClose |

1 numFlashes (Private Variable)

UINT& numFlashes;

This is the reference to the variable in its parent, TCharonWin, which contains the number of words per flash.

2 TFlashesDialog (Public Constructor)

TFlashesDialog (TWindow *parent, UINT&_ numFlashes);

This constructor creates the dialog object. The parameter is its parent pointer and the reference to the variable num-Flashes in its parent.

3 SetupWindow (Private Function)

void SetupWindow ( );

This function overwrites the function in the ancestor class. It calls SetDIgItemInt( ) to set variable numFlashes into the edit box defined in the resource editor.

4 CanClose (Private Function)

BOOL CanClose ( );

This function overwrites the function in the ancestor class. If the base CanClose( ) returns TRUE, it calls GetDIgItemInt( ) to get the content of its edit box into the variable numFlashes. The function returns TRUE, ie okay to close the dialog box, if numFlashes is greater than zero.

The class TBrowserPane 21e is derived from TEditFile. The ancestor class contains an edit window and takes care of block selection whose offset positions can be obtained by calling API's GetSelection( ). These are referred to here as the "API markers".

TBrowserPane implements two additional markers known as "application markers". Their purpose is to remember the offsets of the user's block selection originally noted by the API markers such that, although the API markers may be used to mark some other blocks, the original selection is still recorded. This class also takes care of centring, if possible, the line of text that contains these sub-markers.

The functions of this class are as follows:

| TBrowserPane | TEditFile |
| --- | --- |
| TBrowserPane | |
| PresentLine | |
| GetSelectionStart | |
| BlockBegin | |
| BlockBegin | |
| BlockEnd | |
| BlockEnd | |
| IsSelectionChanged | |
| RememberBlock | |
| SelectBlock | |
| SelectAll | |
| SetupWindow | SetupWindow |
| EvSize | EvSize |
| CalcMiddleLine | |

1 blkBegin (Private Variable)

UINT blkBegin

This is the beginning application marker. It records where the user would like to start the reading of text. The value of this variable is changed by the parent window, TCharonWin, via member function RememberBlock( ), when it detects that there is an explicit change to the internal markers portions by the user, either through the mouse pointer or the keyboard cursor. This detection is done only when the application tries to restart flashing in TCharonWin::CmGo( ) and TCharonWin::Pause( ).

2 blkEnd (Private Variable)

UINT blkEnd;

As with blkBegin, this is the end application marker.

3 numberMidLines (Private Variable)

int numberMidLines;

This is one half of the number of text lines that an instance of TBrowserPane can hold at its current window size.

4 lastSelectionPos (Private Variable)

UINT lastSelectionPos;

This marks the beginning offset of flashing text relative to the beginning of the file. Its purpose is to record the starting API marker while the flashing is in progress, so that any relocation of the block selection by the user, either through the mouse pointer or the keyboard cursor, during the flashing process, will be recognised.

5 TBrowserPane (Public Constructor)

TBrowserPane (Twindow *parent);

This constructs a browser window initialising lastSelectionPos to zero. It also calculates the number of lines that one half the window would allow and stores it in the variable numberMidLines.

6 PresentLine (Public Function)

void PresentLine (UINT startpos, UINT endpos);

This function highlights the word or words contained within startPos and endPos, and puts the selected block of text in the middle of the window if possible.

First the function calls SetSelection( ) to select, thus highlighting, the word or words. It records the start of the selection in lastSelectionPos so that it can recognise that the user has explicitly relocated the selection, if any.

To put the selection in the middle of the window, it adds one half the number of lines in the window (ie numberMid-Lines and the line number of the first line in the window (by calling GetFirstVisibleLine( )), thus obtaining the absolute line number of the middle line of text relative to the entire file. It calls GetLineFromPos( ) to get the line number being selected, and subtracts from this the absolute line number to obtain the number of lines that must be scrolled, so that the selection appears in the middle of the window.

7 GetSelectionStart (Public Function)

UINT GetSelectionStart ( );

This function returns the starting API marker. It calls the base function GetSlection( ), discards the end marker and returns the start marker.

8 BlockBegin (Public Function)

UINT BlockBegin ( );

This overloaded inline function returns the starting application marker, blkBegin.

9 BlockBegin (Public Function)

void BlockBegin (UINT val);

This overloaded inline function sets the starting application marker, blkBegin, to the value in val.

10 BlockEnd (Public Function)

UINT BlockEnd ( );

This overloaded inline function sets the ending application marker, blkEnd.

11 BlockEnd (Public Function)

void BlockEnd (UINT val)

This overloaded inline function sets the ending application marker, blkEnd, to the value in val.

12 IsSelection Changed (Public Function)

BOOL IsSelectionChanged ( );

This inline function tests whether the user has relocated the cursor or block selection while flashing is in progress. This is done by testing that the position currently selected by the starting API marker while in the flashing process, is the same as that which was previously stored in lastSelectionPos. If this test is TRUE, then a relocation was not done.

13 RememberBlock (Public Function)

void RememberBlock ( );

This function remembers the currently selected block by storing the API block markers in blkBegin and blkEnd. If both API markers are at the same position, ie there is no block selected in the window, nothing is done.

14 SelectBlock (Public Function)

void SelectBlock ( );

This inline function calls SetSelect( ) with variables blkBegin and blkEnd to set the entire reading block. Thus the API markers are given the same values as the application markers.

15 SelectAll (Public Function)

void SelectAll ( );

This function selects the entire text contained in the window by setting blkBegin to the first character (ie zero) and blkEnd to the last possible character (ie FFFF hex). It then calls SetSelection( ) to set the block.

16 SetupWindow (Private Function)

void SetupWindow ( );

This inline function overwrites its ancestor. Its purpose is to disable editing within this window. The function first calls the base SetupWindow( ) and then SetReadOnly( ) with a parameter of TRUE to disable writes.

17 EvSize (Private Function)

void EvSize (UINT sizeType, TSize& size);

This inline function overwrites its ancestor. Its purpose is to trap a window resize event (ie WM_SIZE) and call CalcMiddleLine( ). It does this by taking the window's client size between the bottom and the top, and dividing it by the font's height including the leads.

The class TFlashPane 21f is derived from TWindow and manages, in addition, the display word or words. This line of text and its display font are taken from its parent window, TCharonWin.

The member functions of this class are as follows:

| TFlashPane | TWindow |
|---|---|
| TFlashPane | |
| RepaintWindow | |
| Paint | ~~Paint~~ |

1 parentWin (Private Variable)

TCharonWin *parentwin;

This is the pointer to the parent window TCharonWin, from which it gets information on text to display and display font.

2 TFlashPane (Public Constructor)

TFlashPane(TCharonWin *parent);

This constructs a text flashing window, initialising parentWin with the address of the parent window (ie TCharonWin).

3 RepaintWindow (Public Function)

void RepaintWindow ( );

This inline function calls Invalidate( ) and Updatewindow( ) of the ancestor class to redraw the client area of the window immediately.

4 Paint (Private Function)

void Paint (TDC& dc, BOOL, TRect&);

This function overwrites the ancestor function that is called whenever the window is to be repainted. It selects the parents display font and paint the word or words in parentWin's strIn.

The function first gets its window client dimensions and determines that the font that would be best suited to this window is one half that of the height of the window display (ie bottom minus top). It uses this parameter to get the display font from its parent by calling TCharonWin::SetDisplayFont( ). It sets the text insertion base to be the centre of the text it will display (by calling SetTextAlign( ) with TA_CENTER), the background of this font is the windows background (by calling SetBkMode( ) with TRANSPARENT), and the colour of this font is that defined in the parent's fontData.Color. It proceeds to write the text by calling TextOut( ).

Finally, the class TString 21g is derived from ancestor class string, and in addition, it handles reading a number of words (as determined by the variable TCharonWin::numFlashes) from an input stream.

The member functions of this class are as follows:

| Tstring | string |
|---|---|
| GetAFlash | |
| GetAppendToken | |

1 numFlashes (Public Variable)

UINT numFlashes;

This holds the number of words, as determined by from the user, to read from the input file stream. The number of words successfully read by this class will be held by the class and ultimately used for displaying in the bottom pane. This is a public variable and can be directly changed from class TCharonWin.

2 GetAFlash (Public Function)

int GetAFlash (istream_FAR &is, UINT &startPos,
    UINT &endPos);

This function reads a user specified number of words from a disk file stream and returns the actual number of words read. It first clears its API string buffer and calls GetAppendToken( ) repeatedly to get a word from a file stream, istream (is), until the number (as determined by variable numFlashes) is reached. The acutal number of words read can be anything less or equal to this variable (see member function GetAppendToken( ) for further details). The starting position of the file stream where the reading took place is returned in startPos, and the ending position in endPos.

3 GetAppendToken (Private Function)

FLASH_STATUS GetAppendToken (istream_FAR &is);

This function reads one word and appends it into its API string buffer from a file istream (is). It returns a status of UNSUCCESSFUL on an unsuccessful read, SUCCESSFUL on a successful read, and END_OF_FLASH on a successful read but where a punctuation or a sentence ending mark exists as the last character of the word. The END_OF_FLASH status informs the calling function (ie GetAFlash( )) that this function should no longer be called without a screen display since its internal string buffer is ready.

If a word is successfully read, it is appended to the end of its internal string buffer. However, before appending is performed, if the internal string buffer contains anything (ie a previous word), one space character (ie ASCII 32) is appended after the last word before the current word is appended.

A word is a token, and is defined as characters with whitespaces in front of and behind it (see read_token( ) of the string class). The constant, PUNCTUATION_LIST, within global function IsPunctuation( ), is a set of non-sentence-stopping punctuations indicating either the beginning or end of a word. The constant, SENTENCE_END_LIST, within global function IsSentenceEnd( ), is a set of punctuations indicating the end of a sentence.

Now having regard to the non-class functions 23, these are as follows:

1 GetProfileInt

UINT GetProfileInt (char *keyName, UINT defVal);

This function gets an integer value from the file, CHARON.INI, under the section [Charon Reader]. The entryname is the name of the entry in CHARON.INI, and defVal is the default value if such entry does not exist.

It calls the API, GetPrivateProfileInt( ).

2 WriteProfileInt void WriteProfileInt (char *keyName, UINT val);

This function writes an integer value into the file, CHARON.INI, under the section [Charon Reader]. The entryName is the name of the entry in CHARON.INI, and val is the value this function will write.

Its first call first converts the value into a string and then it calls API, WritePrivateProfileString( ).

3 Delay void Delay (UINT factor)

This function does a local loop of nested for statements to while away processor time. The parameter, factor, determines the number of loops this function must make. This number can be arbitrary, but calculation of it at the beginning of the application helps to determine the number that would make this function run in a factor of milliseconds (see TCharon::SetupWindow( )).

An MS Windows application usually does not use a local delay loop (especially without calling TApplication::PumpWaitingMessages( )) as this method would cause other Windows applications, and even itself, to freeze. However, this application must sometimes have clock tick resolution finer than 55 millisecond. When such granulity is needed, this function is used (see TCharonWin::DelayUntilTime( ) for details on how delays are conditionally implemented).

4 IsPunctuation

BOOL IsPunctuation (char mark);

This function returns TRUE if the parameter mark is a character in the defined punctuation list, PUNCTUATION_LIST.

5 IsSentenceEnd

BOOL IsSentenceEnd (char mark);

This function returns TRUE if the parameter mark is a character in the defined sentence terminator list, SENTENCE_END_LIST From the general description of classes and their member functions, a number of important aspects of the system are referred to which will be better appreciated from a description of the actual operation of the computer program. This description will now be made with respect to the general screen layout and given from the user's perspective of the operation of the computer program. Accordingly, reference will be made to the functional flowchart of the computer program shown in FIG. 3 of the drawings and the display screen layouts shown in FIGS. 4 to 18.

Initially, the computer program is executed by running the executable file '.exe' which has been compiled by the program and the dynamic linked libraries, previously described. This will initially invoke the TCharApp class of functions 21a and bring up the screen shown in FIG. 4 of the drawings by invoking the TCharonWin class of functions 21b, together with the TBrowserPane class of functions 21e and the TFlashPane class of functions 21f. The screen, as can be seen, has the standard WINDOWS (registered trade mark) layout, comprising a title bar 31, a menu bar 33, tool bar 35, a browser pane 37, a flash pane 39, a status bar 41, a control menu box 43 and minimise, maximise and restore buttons generally shown at 45.

Figure 3:
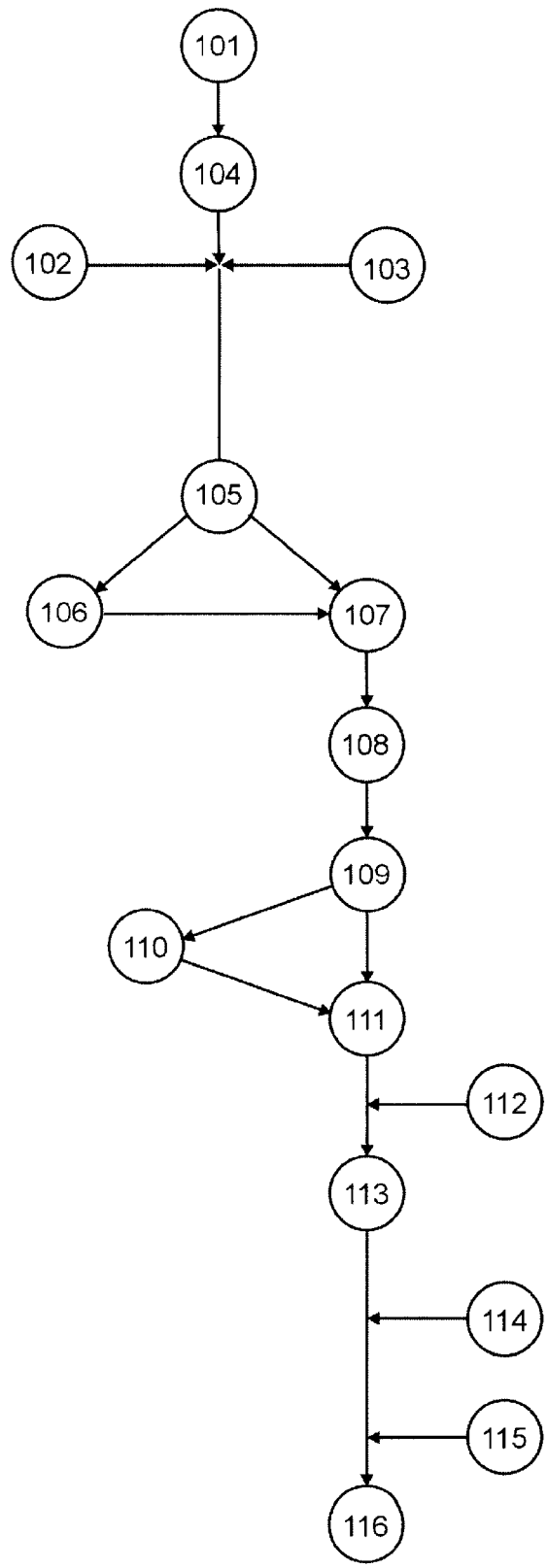
FIG. 3 is a flow chart showing the various functions performed by the system.

The invoking of these initialisation functions is represented by circle 101 shown in FIG. 3.

The menu bar includes menu headings 'File', 'Speed', 'Read', 'Options' as previously described. The tool bar 35 includes a new document button 47, a start button 49, an increase scanning speed button 51, a decrease scanning speed button 53 and a pause button 55.

The browser window pane 37 includes a vertical scroll bar 57 and a horizontal scroll bar 59.

In the present embodiment, the browser pane is set to approximately 65% of the size of the screen and the flash pane is set to 35%.

The status bar 41 includes a progressive tally of the words per minute that are being scanned by the program and the time interval or duration that a discrete portion of the text is displayed for in milliseconds.

Figure 5:
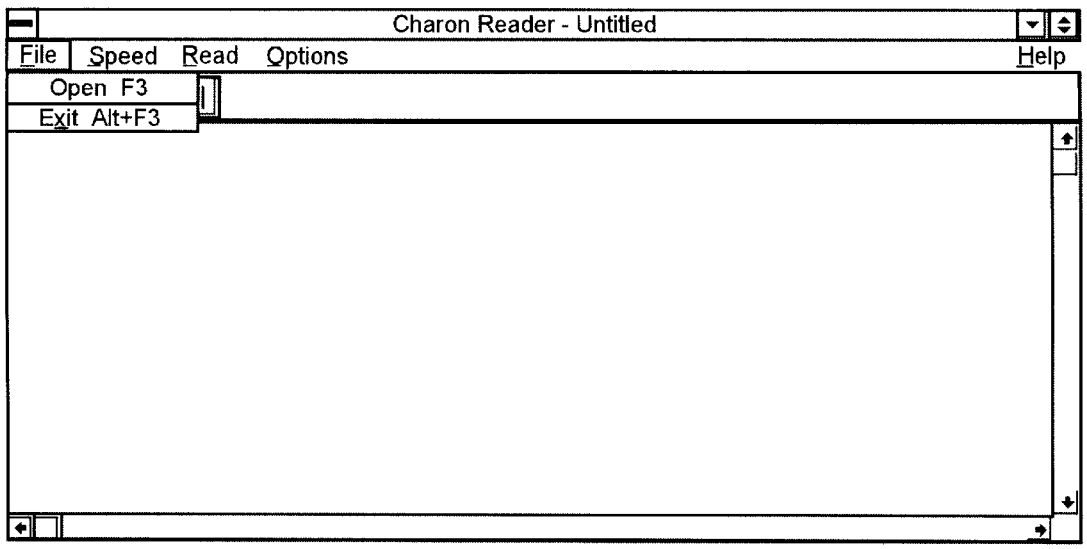
FIG. 5 is a copy of the screen layout showing the pull down 'File' menu.
Figure 6:
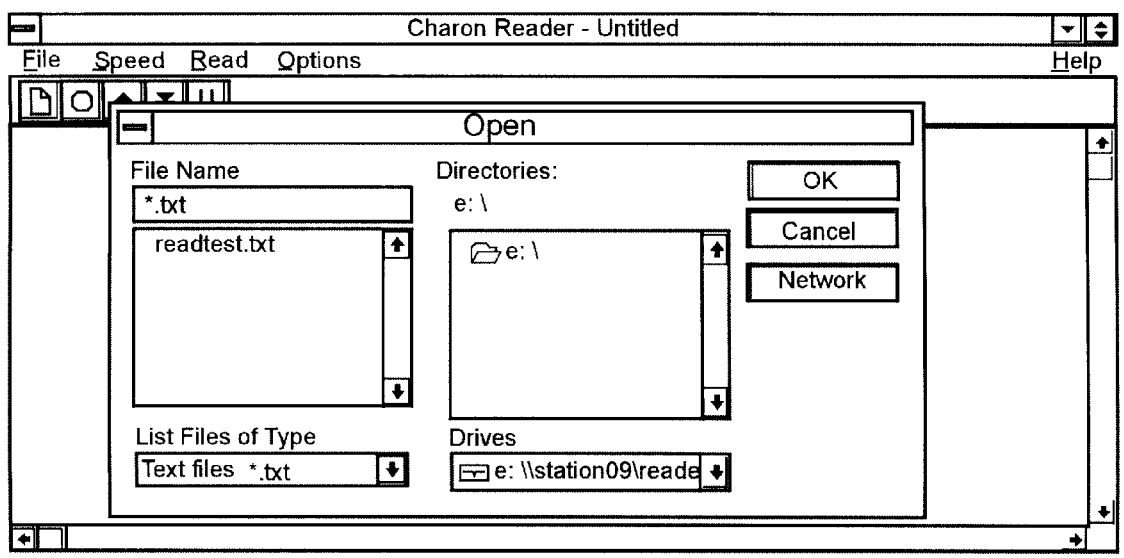
FIG. 6 is a copy of the screen layout with the 'Open' dialog box open ready to open a text file to read.

As represented by circle 102 in FIG. 3, a file is selected by opening the 'File' menu, as shown in FIG. 5 of the drawings, and selecting the 'Open' option which brings up the 'Open' dialog box, as shown in FIG. 6 of the drawings.

It should be noted that the means for exiting the program is also provided under the 'File' menu by selecting the Exit option, also shown in FIG. 5 of the drawings.

In the 'Open' dialog box, the text file is selected in known manner, and in the case of the present embodiment, the file selected is 'readtest.tx'.

Figure 7:
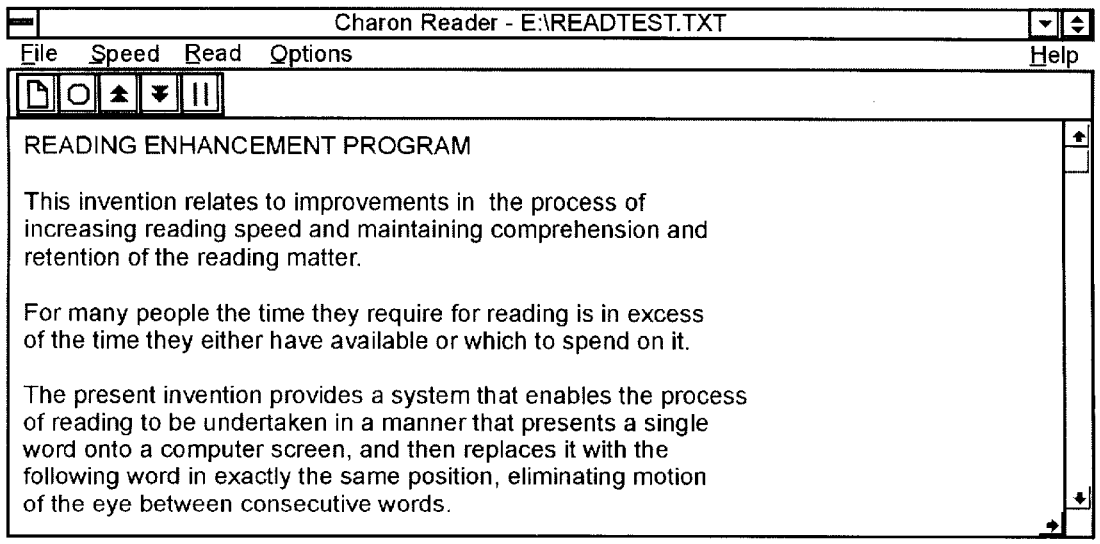
FIG. 7 is a copy of the screen layout showing the browser pane and flash pane with the first portion of the text file to be read displayed within the browser pane.

Selecting the desired file locates the first, larger portion of the text thereof in the browser pane 37, as shown in FIG. 7 of the drawings.

Subject to setting the control parameters of the program, the program is ready to proceed with reading.

Setting of the control parameters is represented by circle 103 in FIG. 3, and this is done via the menu item 'Options'.

Figure 8:
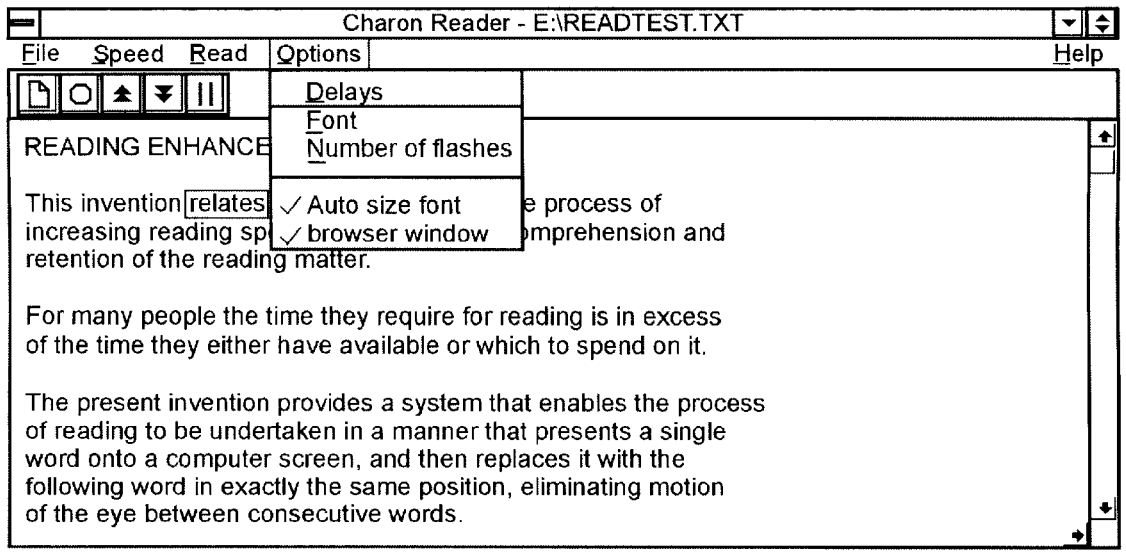
FIG. 8 is a similar view to FIG. 7, but showing the pull down 'Options' menu.

As shown in FIG. 8 of the drawings, there are three suitable options: namely 'Delays', 'Font' and 'Number of flashes', each of which have a dialog box associated therewith, and two toggle options: namely 'Auto size font' and 'Browser window'.

Figure 9:
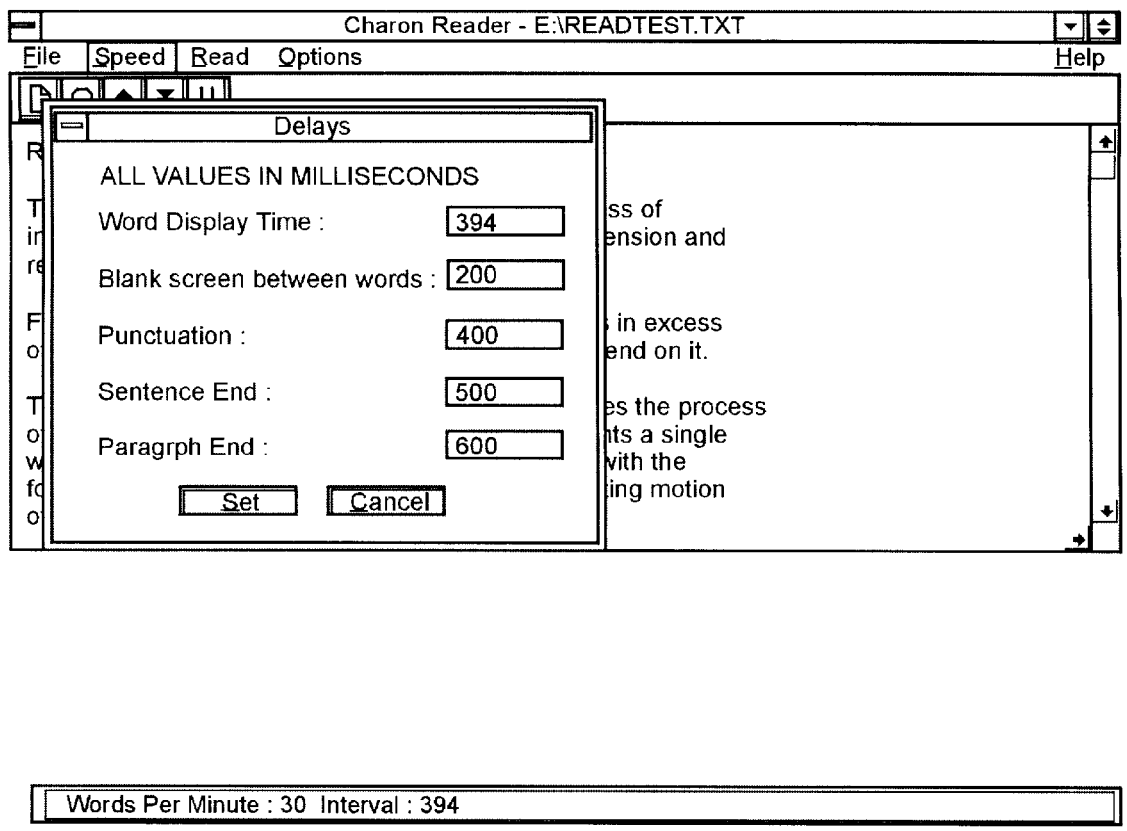
FIG. 9 is a copy of the screen layout showing the 'Delays' dialog box open after selecting the same from FIG. 8.

The first option 'Delays' invokes the TDelaysDialog class of functions 21c and brings up a dialog box as shown in FIG. 9 of the drawings, which lists the control parameters: 'Word Display Time', 'Blank screen between words', 'Punctuation', 'Sentence End' and 'Paragraph End'.

The 'Word Display Time' parameter defines the display time or duration that a discrete portion of located text is displayed at the same position in the flash pane 39 on the screen, and this value is the same value which appears under 'Interval' in the status bar 41. The 'Blank screen between words' parameter defines the blanking time interval that occurs between the display of successive words in the flash pane 39. The 'Punctuation' parameter defines the blanking time interval which occurs following the display of a discrete portion of the text upon the flash pane to the next discrete portion of text displayed, when the first portion of text includes punctuation such as a comma, quotation mark or the like. The 'Sentence End' parameter defines the blanking time interval that occurs between successive discrete portions of text being displayed, when the end of a sentence is reached, denoted by a full stop, exclamation mark, question mark or the like. Finally, the 'Paragraph End' parameter defines the blanking time interval that occurs following the display of a discrete portion of text which occurs at the end of a paragraph until the display of the next discrete portion of text at the commencement of the next paragraph.

Figure 10:
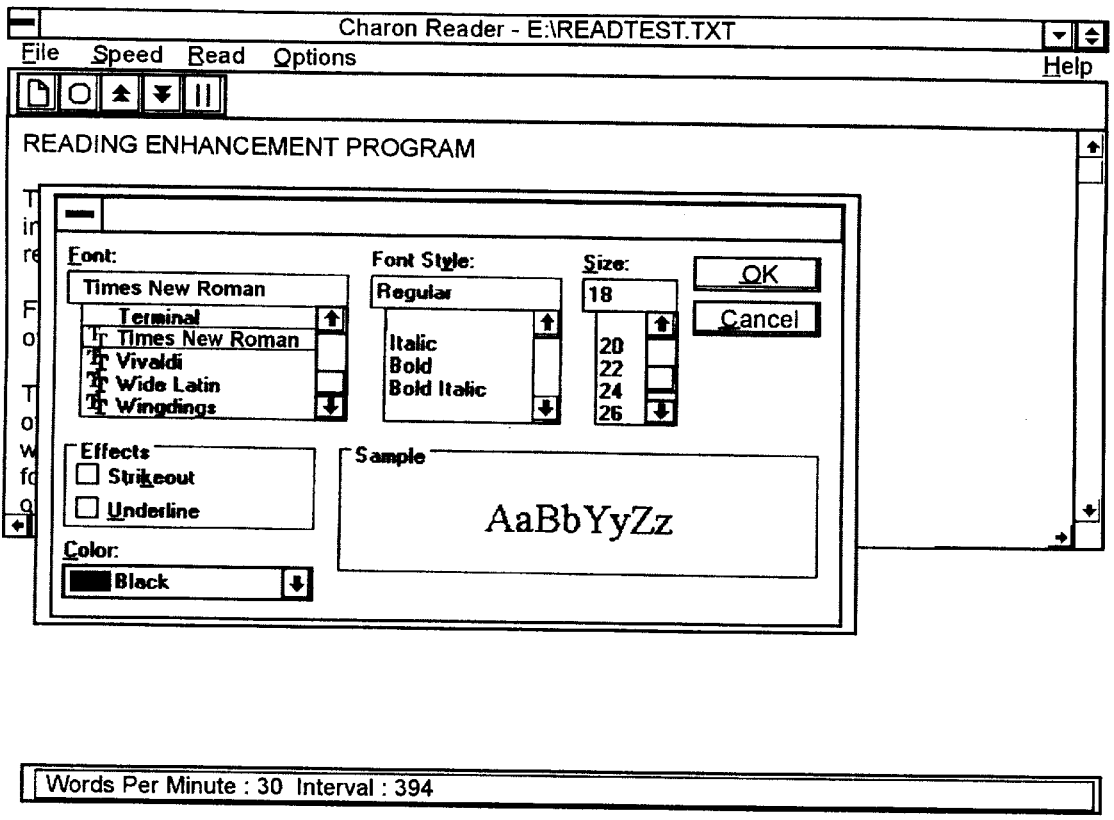
FIG. 10 is a copy of the screen layout showing the 'Font' dialog box open after selecting this from the 'Options' menu shown in FIG. 8.

The 'Font' option brings up the 'Font' dialog box shown in FIG. 10 of the drawings, which is obtained from one of the standard dynamic linked libraries, whereby the font is chosen in known manner.

Figure 11:
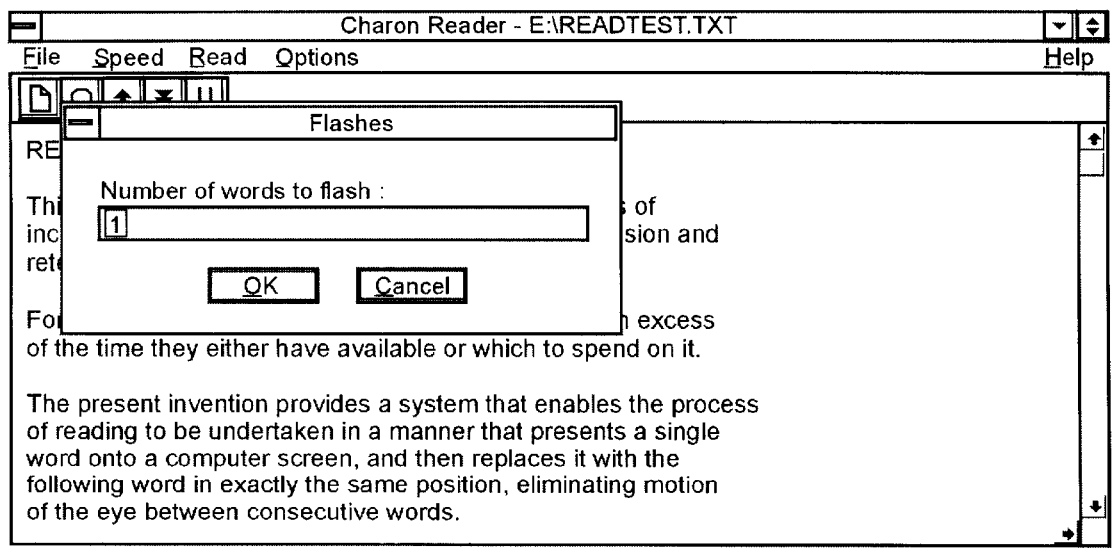
FIG. 11 is a copy of the screen layout showing the 'Flashes' dialog box open, when selected from the 'Options' menu shown in FIG. 8.

The 'Flashes' option when selected invokes the TFlashesDialog class of functions 21d and brings up the dialog box shown in FIG. 11 of the drawings. This provides for the setting of the control parameter for defining the number of words to flash at any one time, being the number of words appearing in the discrete portion of text to be located on the flash pane 39.

With respect to the 'Auto size font' option, selecting the same invokes a function for automatically sizing the font of the displayed portion of text in the flash pane 39, as shown in FIG. 8 of the drawings. In the present embodiment, the font automatically defaults to true type Times New Roman represented in a regular font style of size 24 pitch. In order to change this setting, it is necessary to deselect the 'Auto size font' option, and set new control parameters for the font under the font option as previously described.

Figure 4:
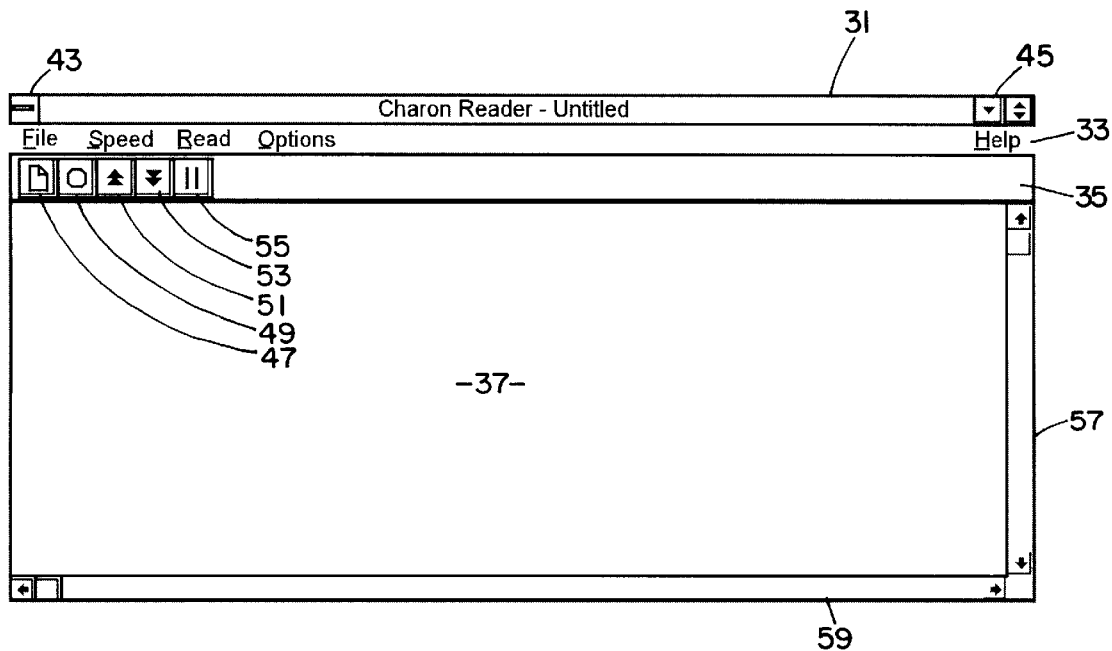
FIG. 4 is a copy of the general screen layout of the main screen.
Figure 4:
Figure 12:
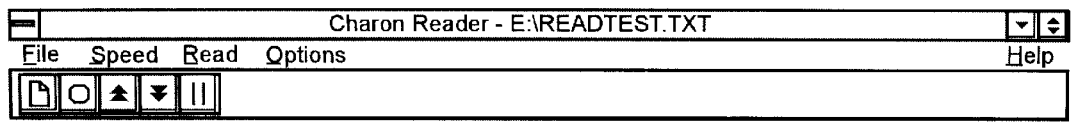
FIG. 12 is a copy of the screen layout displaying only the flash pane with a single word being displayed.
Figure 13:
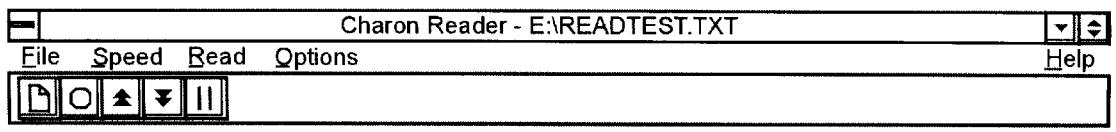
FIG. 13 is a similar view to FIG. 12 but showing a different word, but similarly laterally centered.

The 'Browser window' option when selected invokes a function to cause the browser pane 37 to be displayed as well as the flash pane 39 as shown in FIG. 4, in the window proportions previously described. When deselected, only the flash pane 39 is presented, taking up the entire display window, as shown in FIGS. 12 and 13 of the drawings. These functions are represented by circle 105.

Figure 14:
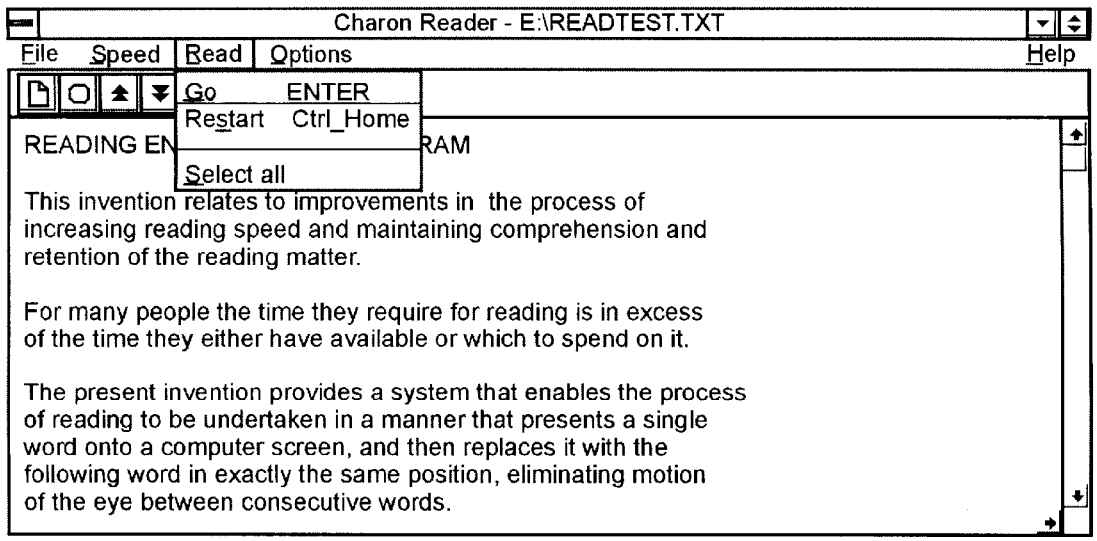
FIG. 14 is a similar view to FIG. 7, but showing the pull down 'Read' menu.

After setting the settable control parameters, the reading program can then be invoked to commence reading the text. This invocation of the program can be performed via the 'Read' menu, the start button 49 or via a key accelerator. In the case of the 'Read' menu, the pull down menu for this provides for three options as shown in FIG. 14 of the drawings, the first being 'Go', the second being 'Restart' and the third being 'Select all'. Selecting the 'Go' option or pressing the key accelerator G invokes the function to commence reading the text file. Alternatively, the same function is invoked by pressing the enter key or by pressing the start button 49.

The option 'Restart' is effective after the program has commenced reading, and upon selection invokes a function to return the reading program to its start status and await a command. This option can also be invoked by pressing the key accelerator 's' or the control and home keys of the keyboard.

The option 'Select all' is the default control parameter for the block definition of the file to be read at initialisation, whereby all of the text within the open file is selected for reading. The block definition will be described shortly. The purpose of the 'Select all' option has effect after a block of text has been selected to be read, and it is desired to return to reading the entire text file. This option can also be invoked by pressing the key accelerator 'S'.

Figure 15:
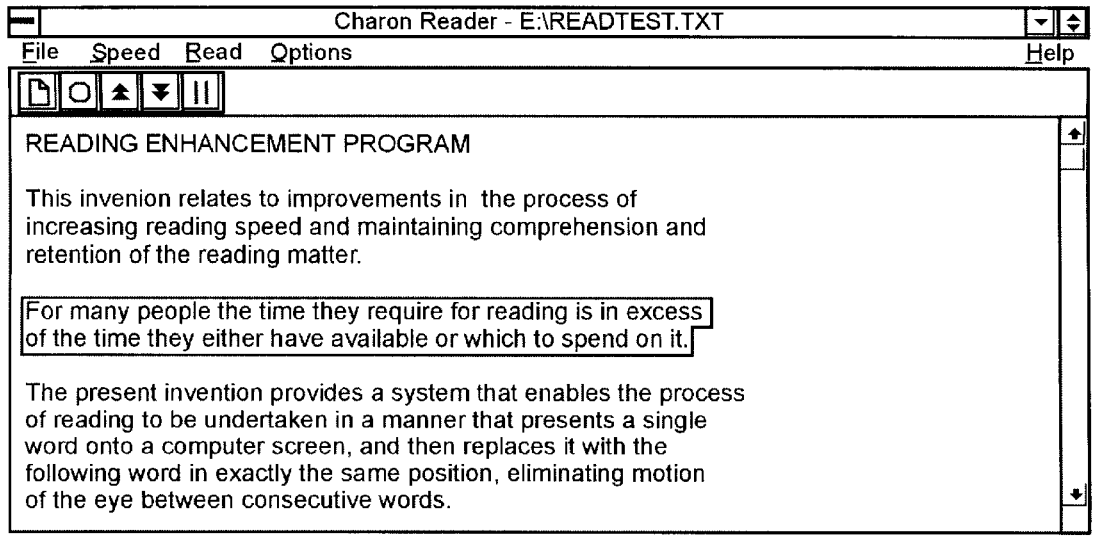
FIG. 15 is a copy of the screen layout showing both the browser pane and the flash pane with a block of text selected within the browser pane.

The block definition is performed under the TBrowserPane class of functions 21e as represented by circle 104 shown in FIG. 3. The block definition as previously described has a default setting being the entire file that is open, and so this function is invoked directly after initialisation. However, the block definition can be changed so that only a particular paragraph or sentence of the file is read by setting the beginning and end application markers for the text displayed within the browser pane. This is conveniently performed by using the mouse button to locate the 'I' beam cursor at a desired beginning location of the text, holding down the left mouse button and dragging the 'I' beam to the end position of the text to be read. As the 'I' beam is dragged, the selected block of text is progressively highlighted until the entire block is defined, as shown in FIG. 15 of the drawings.

The beginning application marker for defining the block can be repositioned whilst the test file is being read, if desired, as represented by circle 109. In addition, after a highlighted block of text is read by the computer program, the program calls a function to highlight the block of text upon reaching the end application marker, as represented by circle 116.

Figure 16:
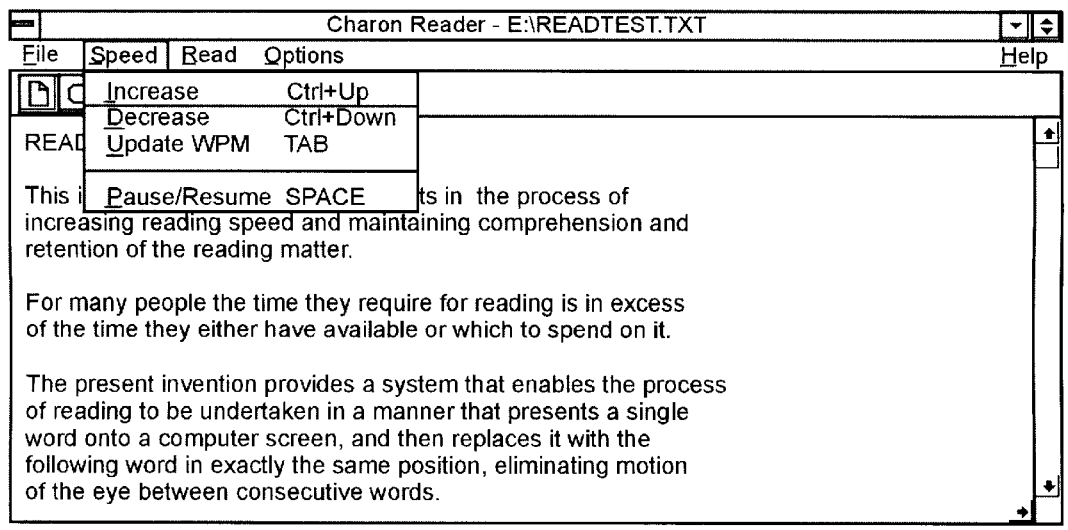
FIG. 16 is a similar view to FIG. 7, but showing the pull down 'Speed' menu.

In addition to the settable control parameters, the "Speed" menu provides for varying certain of the control parameters, namely increasing and decreasing the reading speed as represented by circle 111, ie the word display time and the blanking time interval, and the resetting of the word per minute calculation as represented by the circle 112, the result of which is displayed in the status bar 41 of the screen to reset the cumulative word per minute reading rate. The pull down menu associated with the "Speed" menu item is shown at FIG. 16 of the drawings.

The 'Increase' and 'Decrease' speed options are respectively linked with the increase and decrease speed buttons 51 and 53 respectively, to invoke the relevant in-line functions CmIncrease rate and CmDecrease rate respectively, which call the function IncreaseAWord, all of which were previously described in relation to the class TCharonWin. Accordingly for low display times, by selecting 'Increase', the 'Word Display Time' is decremented by 1 millisecond upon each selection of the 'Increase' option or press of the increase speed button 51. Conversely, the 'Word Display Time' is incremented by 1 millisecond for each selection of the 'Decrease' speed option or the press of the decrease speed button 53. Alternatively for high display times, the 'Word Display Time' is decremented or incremented by a time period corresponding to a 1 WPM change. These functions are represented by the circle 113. In the present embodiment, such alterations of speed do not change the control parameter setting for the blanking time interval, which remains constant at the set value as determined via the 'Delays' dialog box shown in FIG. 9 of the drawings.

The option "update WPM" invokes the function CmResetWPM as represented by circle 108 to reset the variables pertaining to the calculation of the word per minute count. The function ShowWordsPerMinute which in turn calls the member function WordsPerMinute, both of which are members of the TCharonWin class, are called in the normal course of operation of the computer program and return the current word per minute count, calculated in the manner previously described, and display the same in the status bar 41. As the calling of CmResetWPM resets the variables to zero, the WPM rate displayed in the status bar fluctuates significantly whilst the word count is low after resetting.

The pull down menu for the 'Speed' menu, also includes the option 'Pause/Resume' which is correspondingly linked to the pause button 55. Selecting the 'Pause/Resume' option or the pause button toggles between stopping the displaying of discrete portions of text at the point of displaying the text or blanking between text, and starting the displaying or flashing of discrete portions of text, spaced apart by the blanking time interval, by invoking the function CmPause which is also a member of the class TCharonWin, as represented by circle 110. Accordingly, the reading of text can be paused or resumed in this manner at any time during the reading operation.

As previously mentioned, reading of the defined block of text is commenced by pressing the start button 49, selecting the 'Go' option under the 'Read' menu or by pressing the enter key of the keyboard. Any of these actions invoke the function CmGo which is also a member of the class TCharonWin, which in turn causes other functions to be invoked subject to the state of the program. Thus function CmGo in normal operation sequentially locates discrete and successive portions of text at the same position on the flash pane for a prescribed display time and at a prescribed blanking time interval apart, which times and intervals are determined by setting of the appropriate control panels previously described.

Figure 17:
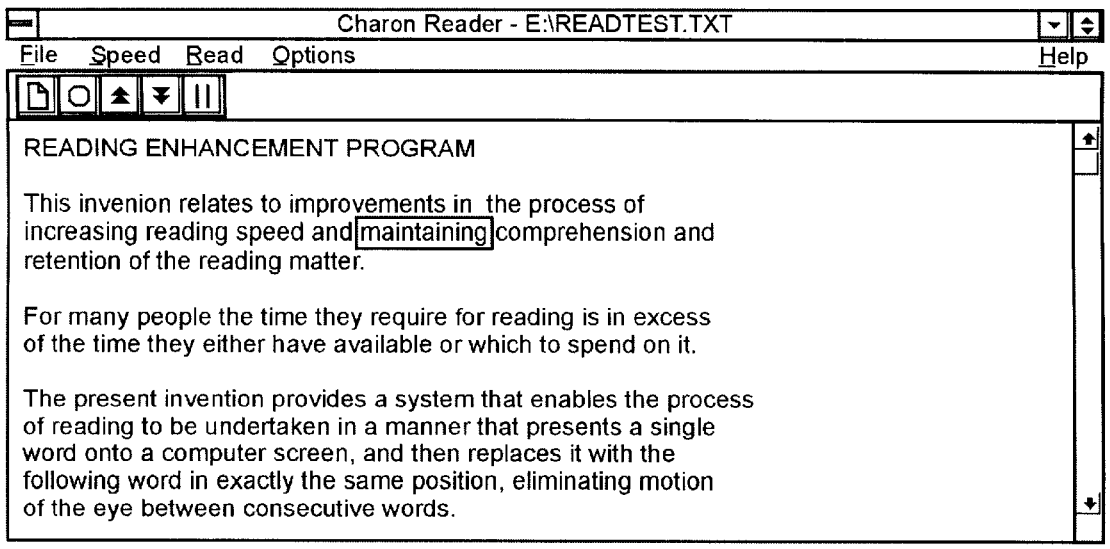
FIG. 17 is a similar view to FIG. 7 showing the commencement of the reading program with the flash pane presenting the discrete portion of text to be read and the browser pane highlighting the corresponding portion of text.

In the case that the browser pane 37 is selected to be displayed in conjunction with the flash pane 39, the displayed discrete portion of text on the flash pane is simultaneously highlighted within the browser pane as shown in FIG. 17 of the drawings with the word "maintaining". The function also invokes centring means represented by circle 107 to centre each discrete portion of text laterally within the flash pane so that the centre of each discrete portion of text is displayed at the same location. An example of this is shown in FIGS. 12 and 13 with the words "the" and "developed" centrally displayed within the flash pane, and also in FIG. 17 with the word "maintaining" within the flash pane.

Figure 18:
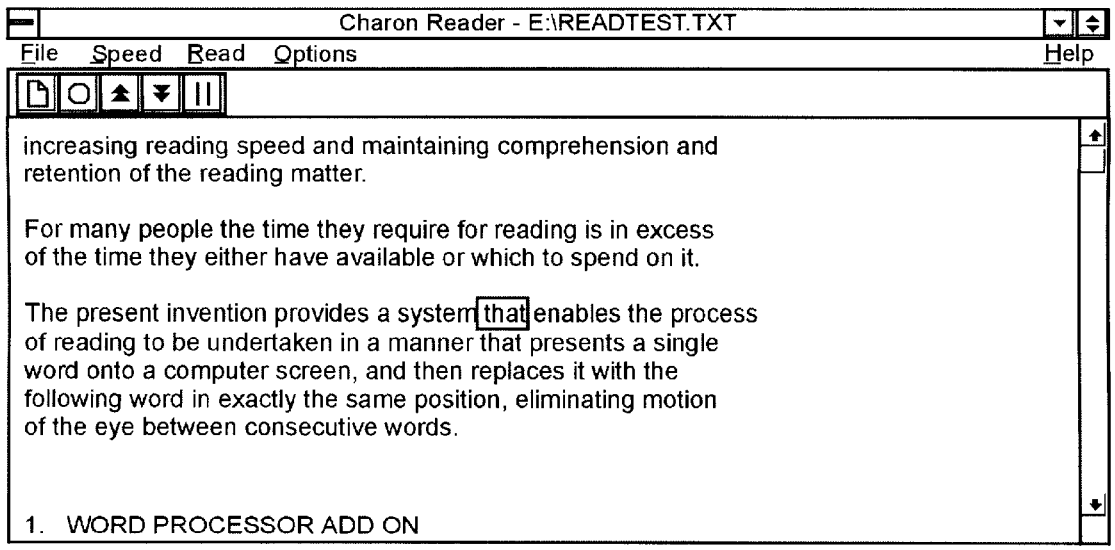
FIG. 18 is another view of the general screen layout showing the browser pane and the flash pane, and a high-lighted word being displayed as the discrete portion of the text being read, illustrating the centring of the text within the browser pane.

Furthermore, in the case when the browser pane is selected to be displayed, the function invokes centring scrolling means represented by circle 106 for automatically scrolling the presentation of the larger portion of text being displayed within the browser pane, and centring the row containing the text that corresponds to the discrete portion of text being displayed within the flash pane, as best shown in FIG. 18. It should be noted, however, that in order for the centring scrolling means to commence automatic scrolling and centring of the row presenting the text corresponding to the discrete portion of text being displayed in the browser pane, sufficient rows of text above the row highlighting the corresponding discrete portion of text, need to be present within the file, as is shown in FIG. 18. Thus, when commencing reading of text from the start of the file, the highlighted portion of text will commence from the top row and move progressively down the browser pane as shown in FIG. 17, until the centre of the pane is reached, before automatic scrolling and centring occurs.

It should be noted that in implementation of the computer program within the WINDOWS (3.1) (registered trade mark) environment the multitasking ability of WINDOWS needs to be accommodated. In this respect, all WINDOWS programs must coexist and be able to work in parallel with other WINDOWS programs in order to enable multitasking to occur. Consequently, it is necessary to design the computer program so as to stay within the limitations imposed by WINDOWS, in order to allow WINDOWS to perform multitasking by WINDOWS doing its own time management.

Accordingly, the computer program includes its own time management means which is invoked when the function DelayUntilTime is called during the operation of the main function FlashLoop of the program, both functions being part of the class TCharonWin. Moreover, the function allows the computer program to use its own timing mechanism so that the 'Word Display Time' and blanking time interval can be adjustable on a high resolution basis such as 1 millisecond increments or decrements, yet still allow WINDOWS to perform its own time management with other WINDOWS applications so as to avoid freezing or disabling of the same. In this respect, the aforementioned functions monitor the time required to do actions within the computer program to determine whether such actions are scheduled to take longer than the requisite 55 millisecond interval before WINDOWS is required to check for calls by other applications and respond to their needs as represented by circle 115. If an action such as displaying a word or words on the screen (ie Word Display Time), or leaving a painted blank screen between words (ie the blanking time interval) is scheduled to be greater than 55 milliseconds, then the program allows for WINDOWS to check for calls by other applications and respond to their needs. Following this, control is then returned to the computer program after 55 milliseconds and the remaining time required to perform the particular action is calculated. If it is greater than 55 milliseconds, the cycle repeats.

When the required time is determined to be less than 55 milliseconds, the function calls a subroutine whereby time is unconditionally dwindled to zero, as represented by circle 114. This is possible due to the previous calculation that determines how many dwindling cycles were required to wile away 1 millisecond of time. This subroutine is invoked by the function Delay, which is one of the non-class functions 23 previously described. After the appropriate time has been dwindled to zero, the functions revert to monitoring the time required to do the next action(s) within the computer program.

Another function provided within the computer program is the blanking and refreshing of the screen between displaying words.

Normally, the presentation of one word after another leaves a shadow image that takes time to adequately disappear. This is most noticeable at high word per minute rates. This image is either caused by the eye and the time required to clear the image of the last word and accept the image of the next word, or possibly as a result of a screen function. As a word image "burns" itself onto the screen, merely stopping it from being presented does not get rid of it altogether and the image takes time to fade. The time between words must be sufficient to allow the shadow image to adequately disappear or else the general impression is that of a blur. Therefore, in order to alleviate the problem, a blank screen delay is introduced between word presentations. As the blanking time interval increases, the pause becomes noticeable and the overall image is more blank than necessary. This makes the words appear to be not as dark as they should be for best word recognition. However, at small blanking time intervals, a "happy medium" can be found that makes the word sequence quite readable.

Consequently, the computer program invokes the function FlashLoop which forms part of the class TCharonWin to repaint the entire flash pane the same colour as the background immediately after the 'Word Display Time' has elapsed, so that the repainted pane is displayed during the blanking time interval.

It should be appreciated that the scope of the present invention is not limited to the particular embodiment described. Accordingly, variations and improvements to the described embodiment of the invention are also envisaged to fall within the scope of the invention as defined. Such variations and improvements include the following functions and/or features:

i) the clearing of a defined block of text from memory, other than by way of using the 'SelectAll' option;

ii) making the browser pane a scalable proportion of the screen relative to the flash pane;

iii) the ability to input a target speed and have the computer program work towards delivering that rate, ie providing a nominal reading rate;

iv) selecting various delays or pausing at the end of a section, chapter or the like of the test;

v) the ability to define multiple blocks to select and subsequently read;

vi) the provision to display the elapsed time since the defined block or entire reading session was commenced, on the status bar;

vii) monitoring of the exact position of the discrete portion of text being displayed within a block of text, such as by counting the word number, so that an accurate word per minute figure can be displayed immediately upon marking new block definitions and commencing reading of the same if that material has already been read;

viii) calculation and display of the estimated time to complete reading of a defined block of text at the current word per minute rate displayed on the status bar;

ix) an annotation facility provided alongside the text;

x) functions such as 'Find' and 'Go To' text in the file as entered by user;

xi) reading for a prescribed time which performs simultaneous functions of counting the number of words read and the word per minute rate for that time period;

xii) the ability to pause the clock tick during the time that titles are read or drop menus are accessed;

xiii) pausing the flashing of text on iconisation;

xiv) the ability to pause reading when the window for the computer program is not the main window being displayed on the screen;

xv) restriction of certain input parameters to ensure values fall within appropriate ranges and character types;

xvi) the ability to read unlimited file sizes;

xvii) the ability to read multiple file formats such as "WORDPERFECT" (trade mark), "AMI-PRO" (trade mark), "word" (trade mark), etc;

xviii) the facility to incorporate the entire computer program as a function invoked within a larger word processing application;

xix) the ability to grab text and read it from anywhere, such as from the windows (registered trade mark) 'clipboard' program;

xx) a skim read feature;

xxi) a snooze facility;

xxii) a facility for voice activations; and xxiii) a facility to handle graphic images with user options to autodisplay, or autopause and query display, or ignore display.

What is claimed is:

1. A system for presenting information for reading including:

display means for displaying the information on a display medium;

processing means to receive the information in an electronically encoded form and process the same for presentation on said display medium;

control means for controlling the presentation of the information on said display medium;

input means for inputting control signals to operate said processing means and said control means and for altering control parameters for said processing means and said control means;

wherein said control means sequentially locates discrete and successive portions of the information at the same position on said display medium the entire portion of each portion being displayed substantially instantaneously at said position for a constant display time; and wherein said control means includes centring means to centre each said portion laterally within said position.

2. A system as claimed in claim 1, wherein said control means includes application means to define a general layout of said display medium for the presentation of the information and visual control attributes of the system.

3. A system as claimed in claim 2, wherein said application means is directly responsive to said control parameters for said control means and invokes particular control functions for defining and specifying particular characteristics of the presentation of the information within said general layout, in accordance with the setting of a particular control parameter therefor and the inputting of said control signals from said input means.

4. A system as claimed in claim 2, wherein said control means includes paning means to arrange said general layout into at least one pane in which the information is presented.

5. A system as claimed in claim 2, wherein said control means includes paning means to arrange said general layout into at least two panes in which the information is presented, said panes include a flash pane and a browser pane, said flash pane including said position and said browser pane including an area for locating a larger portion of the information from which said discrete portions are derived.

6. A system as claimed in claim 5, wherein said control means includes centring scrolling means for automatically scrolling the presentation of said larger portion within said browser pane and centring the row of said larger portion which is presenting corresponding information to said discrete portion, within said browser pane.

7. A system as claimed in claim 5, wherein said paning means includes highlighting means to highlight said corresponding information within said browser pane.

8. A system as claimed in claim 1, wherein said control means includes delay means for setting the control parameters for said constant display time.

9. A system as claimed in claim 1, wherein said control means includes portion selection means for setting the control parameters for said discrete and successive portion.

10. A system as claimed in claim 5, wherein said control means includes pane scaling means for making said browser pane a scalable proportion of a window containing both said browser pane and said flash pane relative to said flash pane.

11. A system as claimed in claim 2, wherein said control means includes scanning rate means for calculating a progressive tally of the information being displayed per time interval and displaying said progressive tally on said general layout.

12. A system as claimed in claim 1, wherein said control means includes control parameter varying means for varying certain of the settable control parameters concurrently and independently of the operation of other control parameters and functions of said control means.

13. A system as claimed in claim 12, wherein said control means includes delay means for setting the control parameters for said constant display time, and said control parameter varying means interacts with said delay means for varying the control parameters for said constant display time, after having been set, in a controlled and continuous manner.

14. A system as claimed in claim 4, wherein said control means displays each said discrete and successive portion of the information at a prescribed blanking time apart, and includes pane repainting means for repainting the pane on which the information is sequentially located, the same colour as the background colour of said pane for the entire duration of said prescribed blanking time, immediately after the elapsing of said constant display time.

15. A system as claimed in claim 1, wherein said processing means is a microcomputer having a graphical user interface including a multitasking windowing function.

16. A system as claimed in claim 15, wherein said control means includes a time management means for monitoring the prospective and elapsed time of functions performed thereby and coordinating the relinquishment and return of control to and from said multitasking windowing function.

17. A system as claimed in claim 16, wherein said time management means:
(i) monitors the time required to perform functions of the system and determines whether a current function is scheduled to take longer than the requisite time interval allowed for such functions by said multitasking windowing function;
(ii) in response to determining current functions scheduled to take longer than said requisite time interval, said time management means relinquishes control of the system to said multitasking windowing function and regains said control after it is returned from said multitasking windowing function and on said return said time management means calculates the remaining time to perform said current function and if greater than said requisite time function, repeats the relinquishing of said control to said multitasking windowing function; and
(iii) in response to determining current functions scheduled to take less than said requisite time interval, said time management means unconditionally dwindles time until the function is completed and monitors the next function.

18. A system as claimed in claim 1, wherein said control means is a computer program comprising a compilation of a plurality of source files including a main source code file, a header file, a resources file and a resource header file, said source files forming an executable file for running together with one or more prescribed dynamic linked libraries on said computer.

19. A system as claimed in claim 5, wherein said control means is a computer program operated by means of menu items each having a corresponding accelerator for sending out a message invoking a function in a prescribed class, said prescribed class including at least one of the following functions:
i) creation of an application for said computer program and an instance for the function holding said browser pane and said flash pane;
ii) holding said browser pane and said flash pane for displaying on said display means;
iii) obtaining various delay rates for operating said flash pane from said input means;
iv) obtaining the number of discrete items of the information per flash of said flash pane from said input means;
v) storing the offsets identifying the block selection of the information and centring same in said browser pane;
vi) managing the display of the information in said flash pane; and
vii) displaying a prescribed number of discrete items of the information to constitute said portion.

20. A system as claimed in claim 19, wherein a said function may invoke further functions corresponding to the functions provided by said control means, wherein said functions comprise said centring means, said application means and said paning means.

21. A system as claimed in claim 5, wherein said paning means arranges for said flash pane and said browser pane to be displayed in the same window in conjunction with each other for simultaneous operation.

22. A system as claimed in claim 5, wherein said control means includes block selection means for selecting a block of the information displayed within said browser pane for subsequent sequential presentation of said discrete and successive portions thereof on said flash pane.

23. A system as claimed in claim 11, wherein said scanning rate means calculates and displays the word per minute rate of information being located and displayed at said position.

24. A system as claimed in claim 1, wherein said control means displays each said discrete and successive portion of the information at a prescribed blanking time apart.

25. A system as claimed in claim 24, wherein said control means includes delay means for setting the control parameters for said prescribed blanking time.

26. A system as claimed in claim 24, wherein said control means includes control parameter varying means for varying certain of the settable control parameters concurrently and independently of the operation of other control parameters and functions of said control means, and wherein said control parameter varying means interacts with said delay means for varying the control parameters for said prescribed blanking time, after having been set, in a controlled and continuous manner.

27. A system as claimed in claim 20, wherein said control means further includes centring scrolling means for automatically scrolling the presentation of said larger portion within said browser pane and centring the row of said larger portion which is presenting corresponding information to said discrete portion, within said browser pane, and wherein said functions include said centring scrolling means.

28. A system as claimed in claim 20, wherein said paning means includes highlighting means to highlight said corresponding information within said browser pane, and wherein said functions include said highlighting means.

29. A system as claimed in claim 20, wherein said control means includes delay means for setting the control parameters for said constant display time, and wherein said functions include said delay means.

30. A system as claimed in claim 20, wherein said control means includes portion selection means for setting the control parameters for said discrete and successive portion.

31. A system as claimed in claim 20, wherein said control means includes pane scaling means for making said browser pane a scalable proportion of a said window containing both said browser pane and said flash pane relative to said flash pane, and wherein said functions include said pane scaling means.

32. A system as claimed in claim 20, wherein said control means includes scanning rate means for calculating a progressive tally of said information being displayed per time interval and displaying said progressive tally on said general layout, and wherein said functions include said scanning rate means.

33. A system as claimed in claim 20, wherein said control means includes control parameter varying means for varying certain of the settable control parameters concurrently and independently of the operation of other control parameters and functions of said control means, and wherein said functions include said control parameter varying means.

34. A system as claimed in claim 20, wherein said control means displays each said discrete and successive portion of the information at a prescribed blanking time apart, and includes pane repainting means for repainting the pane on which the information is sequentially located, the same colour as the background colour of said flash pane for the entire duration of said prescribed blanking time, immediately after the elapsing of said prescribed display time, and wherein said functions include said pane repainting means.

35. A system as claimed in claim 20, wherein said control means includes time management means for monitoring the prospective and elapsed time of functions performed thereby and coordinating the relinquishment and return of control to and from said multitasking windowing function, and wherein said functions include said time management means.

36. A method for presenting information for reading including:
 selecting discrete and successive portions of the information;
 displaying said portions sequentially at the same position of a display medium;
 displaying the entire portion of each discrete and successive portion substanially instantaneously at said position for a constant display time; and
 centring each said portion laterally within said position.

37. A method as claimed in claim 36, including defining and specifying particular characteristics of the presentation of the information within a general layout for displaying on said display medium in accordance with the setting of particular control parameters therefor.

38. A method as claimed in claim 37, including arranging said general layout into at least one pane in which the information is presented.

39. A method as claimed in claim 37, including arranging said general layout into two or more panes in which the information is presented, wherein said panes include a flash pane and a browser pane, said flash pane including said position and said browser pane including an area for locating a larger portion of the information from which said discrete portions are derived.

40. A method as claimed in claim 39, including automatically scrolling the presentation of said larger portion within said browser pane and centring the row of said larger portion which is presenting corresponding information to said discrete portion, within said browser pane.

41. A method as claimed in claim 39, including highlighting said corresponding information within said browser pane.

42. A method as claimed in claim 37, including setting the control parameters for said constant display time.

43. A method as claimed in claim 37, including setting the control parameters for said discrete and successive portion.

44. A method as claimed in claim 39, including making said browser pane a scalable proportion of the visual layout relative to said flash pane.

45. A method as claimed in claim 37, including calculating a progressive tally of the information being displayed per time interval and displaying said progressive tally on said general layout.

46. A method as claimed in claim 37, including varying certain of the settable control parameters concurrently and independently of the operation of other control parameters.

47. A method as claimed in claim 46, including varying the control parameters for said constant display time after having been set, in a controlled and continuous manner.

48. A method as claimed in claim 38, including repainting the pane the same colour as the background colour of said pane for the entire duration of a prescribed blanking time, immediately after the elapsing of said constant display time.

49. A method as claimed in claim 48, including presenting the information for reading in conjunction with a multitasking windowing function.

50. A method as claimed in claim 49, including monitoring the prospective and elapsed time of functions performed by the presenting of the information and coordinating the relinquishment and return of control to and from said multitasking windowing function.

51. A method as claimed in claim 50, including monitoring the time required to perform functions and determining whether a current function is scheduled to take longer than the requisite time interval allowed for such functions by said multitasking windowing function, relinquishing control to said multitasking windowing function and regaining control therefrom in response to determining a current function scheduled to take longer than said requisites time interval, calculating the remaining time to perform said current function on the return of control from said multitasking windowing function, and if greater than the requisite time function, repeating the relinquishing of control to said multitasking windowing function, and unconditionally dwindling time until the function is completed in response to determining a current function scheduled to take less than the requisite time interval and monitoring the next function after said dwindling.

52. A method as claimed in claim 39, including computer program operating menu items each having a corresponding accelerator for sending out a message invoking a function in a prescribed class, said prescribed class including at least one of the following functions:
 i) creation of an application for said computer program and an instance for the function holding said browser pane and said flash pane;
 ii) holding said browser pane and said flash pane for displaying on said display medium;

iii) obtaining various delay rates for operating said flash pane from an input means;

iv) obtaining the number of discrete items of the information per flash of said flash pane from said input means;

v) storing the offsets identifying the block selection of the information and centring same in said browser pane;

vi) managing the display of the information in said flash pane; and vii) displaying a prescribed number of discrete items of the information to constitute said portion.

53. A method as claimed in claim 52, wherein a said function may invoke further functions corresponding to:

(i) centring each said portion laterally within said position;

(ii) defining and specifying particular characteristics of the presentation of the information within a general layout for displaying on said display medium in accordance with the setting of particular control parameters therefor;

(iii) arranging said general layout into at least one pane in which the information is prescribed; and (iv) selectively dividing the visual layout of said general layout into a flash pane and a browser pane, said flash pane including said position and said browser pane including an area for locating a larger portion of said information from which said discrete portions are derived.

54. A method as claimed in claim 39, including displaying said flash pane and said browser pane in the same window in conjunction with each other and simultaneously operating same.

55. A method as claimed in claim 36, including displaying each said discrete and successive portion of said information at a prescribed blanking time apart.

56. A method as claimed in claim 55, including setting the control parameters for said prescribed blanking time.

57. A method as claimed in claim 37, including varying certain of the settable control parameters concurrently and independently of the operation of other control parameters, and varying the control parameters for said constant display time, after having been set, in a controlled and continuous manner.

58. A method as claimed in claim 52, wherein said functions and said further functions include automatically scrolling the presentation of said larger portion within said browser pane and centring the row of said larger portion which is presenting corresponding information to said discrete portion, within said browser pane.

59. A method as claimed in claim 52, wherein said functions and said further functions include highlighting said corresponding information within said browser pane.

60. A method as claimed in claim 52, wherein said functions and said further functions include setting the control parameters for said constant display time.

61. A method as claimed in claim 52, wherein said functions and said further functions include setting the control parameters for said discrete and successive portion.

62. A method as claimed in claim 52, wherein said functions and said further functions include making said browser pane a scalable proportion of the visual layout relative to said flash pane.

63. A method as claimed in claim 52, wherein said functions and said further functions include calculating a progressive tally of said information being displayed per time interval and displaying said progressive tally on said general layout.

64. A method as claimed in claim 52, wherein said functions and said further functions include varying certain of the settable control parameters concurrently and independently of the operation of other control parameters and functions.

65. A method as claimed in claim 52, wherein said functions and said further functions include repainting the pane the same colour as the background colour of said pane for the entire duration of said prescribed blanking time, immediately after the elapsing of said constant display time.

66. A method as claimed in claim 52, wherein said functions and said further functions include monitoring the prospective and elapsed time of functions performed by the presenting of the information and coordinating the relinquishment and return of control to and from the multitasking windowing function.

67. A program storage device readable by a computer, tangibly embodying a program of instructions executable by the computer, to perform method steps for presenting information for reading, the method comprising the steps of:

a) selecting discrete and successive portions of information;

b) displaying said portions sequentially at the same position of a display medium;

c) displaying the entire portion of each said discrete and successive portion substantially instantaneously at said position for a constant display time; and d) centring each said portion laterally within said position.

68. The program storage device of claim 67, further including the step of defining and specifying particular characteristics of the presentation of the information within a general layout for displaying on said display medium in accordance with the setting of particular control parameters therefor.

69. The program storage device of claim 68, further including the step of arranging said general layout into at least one pane in which the information is presented.

70. The program storage device of claim 69, further including the step of arranging said general layout into two panes in which the information is presented wherein said panes include a flash pane and a browser pane, said flash pane including said position and said browser pane including an area for locating a larger portion of the information from which said discrete portions are derived.

71. The program storage device of claim 70, further including the step of automatically scrolling the presentation of said larger portion within said browser pane and centring the row of said larger portion which is presenting corresponding information to said discrete portion, within said browser pane.

* * * * *